(12) United States Patent
Schowengerdt et al.

(10) Patent No.: US 11,300,844 B2
(45) Date of Patent: Apr. 12, 2022

(54) DISPLAY SYSTEM WITH VARIABLE POWER REFLECTOR

(71) Applicant: Magic Leap, Inc., Plantation, FL (US)

(72) Inventors: Brian T. Schowengerdt, Seattle, WA (US); John Graham Macnamara, Plantation, FL (US); Chulwoo Oh, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/175,566

(22) Filed: Feb. 12, 2021

(65) Prior Publication Data

US 2021/0240018 A1   Aug. 5, 2021

Related U.S. Application Data

(62) Division of application No. 15/902,814, filed on Feb. 22, 2018, now Pat. No. 10,962,855.
(Continued)

(51) Int. Cl.
*G02F 1/137* (2006.01)
*F21V 8/00* (2006.01)
(Continued)

(52) U.S. Cl.
CPC ........... *G02F 1/137* (2013.01); *G02B 6/0026* (2013.01); *G02B 6/0055* (2013.01); *G02B 6/0056* (2013.01); *G02B 6/0076* (2013.01); *G02B 6/0088* (2013.01); *G02B 26/0825* (2013.01); *G02B 27/0172* (2013.01);
(Continued)

(58) Field of Classification Search
None
See application file for complete search history.

(56) References Cited

U.S. PATENT DOCUMENTS 3,309,162 A    3/1967  Kosanke et al.
3,724,938 A    4/1973  Nepela
(Continued)

FOREIGN PATENT DOCUMENTS

CA    2385849    3/2001
CN    101359098  2/2009
(Continued)

OTHER PUBLICATIONS

Notice of Allowance for U.S. Appl. No. 15/072,290, dated Jun. 28, 2021.
(Continued)

*Primary Examiner* — Ryan Crockett
(74) *Attorney, Agent, or Firm* — Knobbe, Martens, Olson & Bear, LLP

(57) ABSTRACT

A wearable augmented reality head-mounted display system can be configured to pass light from the world forward a wearer wearing the head-mounted system into an eye of the wearer. The head-mounted display system can include an optical display that is configured to output light to form an image. The system may include one or more waveguides that are disposed to receiving the light from the display. A variable power reflector can be disposed on the forward side of the one or more waveguides. The reflector can be configured to have an optical power that is adjustable upon application of an electrical signal.

20 Claims, 18 Drawing Sheets

Related U.S. Application Data

(60) Provisional application No. 62/462,850, filed on Feb. 23, 2017.

(51) Int. Cl.
*G02F 1/133* (2006.01)
*G02B 27/01* (2006.01)
*G02B 26/08* (2006.01)
*G02F 1/29* (2006.01)

(52) U.S. Cl.
CPC ...... *G02F 1/13306* (2013.01); *G02F 1/13718* (2013.01); *G02F 1/29* (2013.01); *G02F 2203/07* (2013.01)

(56) References Cited

U.S. PATENT DOCUMENTS

| | | | |
|---|---|---|---|
| 4,065,208 A | 12/1977 | Currey | |
| 4,573,982 A | 3/1986 | Forbes et al. | |
| 4,601,545 A | 7/1986 | Kern | |
| 4,669,836 A | 6/1987 | Richardson et al. | |
| 4,693,544 A | 9/1987 | Yamasaki et al. | |
| 4,711,512 A | 12/1987 | Upatnieks | |
| 4,726,667 A | 2/1988 | Tachihara | |
| 4,737,053 A | 4/1988 | Paolini | |
| 4,756,605 A | 7/1988 | Okada et al. | |
| 4,826,308 A | 5/1989 | Sadun | |
| 4,848,898 A | 7/1989 | Massof | |
| 4,919,520 A | 4/1990 | Okada et al. | |
| 4,968,127 A | 11/1990 | Russell et al. | |
| 4,991,924 A * | 2/1991 | Shankar | G02B 5/3016 349/117 |
| 5,142,411 A | 8/1992 | Fiala | |
| 5,166,778 A | 11/1992 | Beamon, III | |
| 5,187,372 A | 2/1993 | Clube | |
| 5,223,971 A | 6/1993 | Magel | |
| 5,359,444 A | 10/1994 | Piosenka et al. | |
| 5,491,492 A | 2/1996 | Knapp et al. | |
| 5,537,162 A | 7/1996 | Hellmuth et al. | |
| 5,544,268 A | 8/1996 | Bishel et al. | |
| 5,566,982 A | 10/1996 | Lehureau et al. | |
| 5,583,670 A | 12/1996 | Iijima et al. | |
| 5,654,786 A | 8/1997 | Bylander | |
| 5,712,721 A | 1/1998 | Large | |
| 5,776,068 A | 7/1998 | Silverman et al. | |
| 5,808,797 A | 9/1998 | Bloom et al. | |
| 5,825,448 A | 10/1998 | Bos et al. | |
| 5,847,798 A | 12/1998 | Yang et al. | |
| 5,915,051 A | 6/1999 | Damask et al. | |
| 5,997,141 A | 12/1999 | Heacock | |
| 6,003,991 A | 12/1999 | Viirre | |
| 6,014,197 A | 1/2000 | Hikmet | |
| 6,015,507 A | 1/2000 | Kobayashi et al. | |
| 6,040,885 A | 3/2000 | Koike et al. | |
| 6,045,515 A | 4/2000 | Lawton | |
| 6,151,167 A | 11/2000 | Melville | |
| 6,181,393 B1 | 1/2001 | Enomoto et al. | |
| 6,188,462 B1 | 2/2001 | Lavrentovich et al. | |
| 6,217,792 B1 | 4/2001 | Parri et al. | |
| 6,235,014 B1 | 5/2001 | Abe et al. | |
| 6,251,101 B1 | 6/2001 | Glockler | |
| 6,307,682 B1 | 10/2001 | Hoffman et al. | |
| 6,334,960 B1 | 1/2002 | Willson et al. | |
| 6,386,706 B1 | 5/2002 | McClure et al. | |
| 6,414,666 B1 | 7/2002 | Yamakawa et al. | |
| 6,437,762 B1 | 8/2002 | Birdwell | |
| 6,447,119 B1 | 9/2002 | Stewart et al. | |
| 6,490,319 B1 | 12/2002 | Yang | |
| 6,491,391 B1 | 12/2002 | Blum et al. | |
| 6,491,394 B1 | 12/2002 | Blum et al. | |
| 6,517,203 B1 | 2/2003 | Blum et al. | |
| 6,542,671 B1 | 4/2003 | Ma et al. | |
| 6,579,235 B1 | 6/2003 | Abita et al. | |
| 6,619,799 B1 | 9/2003 | Blum et al. | |
| 6,680,767 B2 | 1/2004 | Coates et al. | |
| 6,690,845 B1 | 2/2004 | Yoshimura et al. | |
| 6,733,130 B2 | 5/2004 | Blum et al. | |
| 6,735,224 B2 | 5/2004 | Murry et al. | |
| 6,736,510 B1 | 5/2004 | Heugten | |
| 6,750,941 B2 | 6/2004 | Satoh et al. | |
| 6,850,221 B1 | 2/2005 | Tickle | |
| 6,851,805 B2 | 2/2005 | Blum et al. | |
| 6,857,741 B2 | 2/2005 | Blum et al. | |
| 6,871,951 B2 | 3/2005 | Blum et al. | |
| 6,873,087 B1 | 3/2005 | Choi et al. | |
| 6,900,881 B2 | 5/2005 | Sreenivasan et al. | |
| 6,918,670 B2 | 7/2005 | Blum et al. | |
| 6,927,894 B2 | 8/2005 | Blum et al. | |
| 6,975,898 B2 | 12/2005 | Seibel | |
| 6,982,818 B2 | 1/2006 | Riza et al. | |
| 6,986,579 B2 | 1/2006 | Blum et al. | |
| D514,570 S | 2/2006 | Ohta | |
| 7,009,757 B2 | 3/2006 | Nishioka et al. | |
| 7,018,040 B2 | 3/2006 | Blum et al. | |
| 7,019,890 B2 | 3/2006 | Meredith et al. | |
| 7,023,466 B2 | 4/2006 | Favalora et al. | |
| 7,023,594 B2 | 4/2006 | Blum et al. | |
| 7,036,931 B2 | 5/2006 | Lindacher | |
| 7,070,405 B2 | 7/2006 | Sreenivasan et al. | |
| 7,082,000 B2 | 7/2006 | Chen et al. | |
| 7,098,572 B2 | 8/2006 | Choi et al. | |
| 7,122,482 B2 | 10/2006 | Xu et al. | |
| 7,140,861 B2 | 11/2006 | Watts et al. | |
| 7,206,107 B2 | 4/2007 | Levola | |
| 7,341,348 B2 | 3/2008 | Eagan | |
| 7,375,784 B2 | 5/2008 | Smith et al. | |
| 7,418,170 B2 | 8/2008 | Mukawa et al. | |
| 7,425,067 B2 | 9/2008 | Warden et al. | |
| 7,471,362 B1 | 12/2008 | Jones | |
| 7,519,096 B2 | 4/2009 | Bouma et al. | |
| 7,573,640 B2 | 8/2009 | Nivon et al. | |
| 7,692,759 B2 | 4/2010 | Escuti et al. | |
| 7,705,943 B2 | 4/2010 | Kume et al. | |
| 7,883,505 B2 | 2/2011 | Heugten et al. | |
| 8,064,035 B2 | 11/2011 | Escuti et al. | |
| 8,076,386 B2 | 12/2011 | Xu et al. | |
| 8,128,606 B2 | 3/2012 | Anderson et al. | |
| 8,160,411 B2 | 4/2012 | Levola et al. | |
| 8,233,204 B1 | 7/2012 | Robbins et al. | |
| 8,248,458 B2 | 8/2012 | Schowengerdt et al. | |
| 8,264,623 B2 | 9/2012 | Marrucci | |
| 8,279,544 B1 | 10/2012 | O'Neill | |
| 8,339,566 B2 | 12/2012 | Escuti et al. | |
| 8,348,429 B2 | 1/2013 | Walsh et al. | |
| 8,494,229 B2 | 7/2013 | Järvenpäärr et al. | |
| 8,508,848 B2 | 8/2013 | Saarikko | |
| 8,721,572 B1 | 5/2014 | Linder et al. | |
| 8,757,812 B2 | 6/2014 | Melville et al. | |
| 8,820,931 B2 | 9/2014 | Walsh et al. | |
| 8,824,779 B1 | 9/2014 | Smyth | |
| 8,885,161 B2 | 11/2014 | Scheeline et al. | |
| 8,885,997 B2 | 11/2014 | Nguyen et al. | |
| 8,909,327 B1 | 12/2014 | Bosworth | |
| 8,950,867 B2 | 2/2015 | Macnamara | |
| 8,956,396 B1 | 2/2015 | Friend et al. | |
| 9,081,426 B2 | 7/2015 | Armstrong | |
| 9,125,724 B2 | 9/2015 | Berdahl et al. | |
| 9,195,092 B2 * | 11/2015 | Escuti | G02F 1/1393 |
| 9,215,293 B2 | 12/2015 | Miller | |
| D752,529 S | 3/2016 | Loretan et al. | |
| 9,295,388 B2 | 3/2016 | Lawson et al. | |
| 9,310,559 B2 | 4/2016 | Macnamara | |
| 9,345,402 B2 | 5/2016 | Gao | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,462,262 B1 | 10/2016 | Worley, III et al. | |
| 9,462,945 B1 | 10/2016 | Barriga et al. | |
| 9,470,906 B2 | 10/2016 | Kaji et al. | |
| 9,489,044 B2 | 11/2016 | Fateh | |
| 9,547,174 B2 | 1/2017 | Gao et al. | |
| 9,575,366 B2 | 2/2017 | Srivastava et al. | |

(56) References Cited

U.S. PATENT DOCUMENTS

| | | |
|---|---|---|
| 9,664,905 B2 | 5/2017 | Bohn et al. |
| 9,671,566 B2 | 6/2017 | Abovitz et al. |
| D794,288 S | 8/2017 | Beers et al. |
| 9,720,238 B2 | 8/2017 | Munger et al. |
| 9,740,006 B2 | 8/2017 | Gao |
| 9,791,700 B2 | 10/2017 | Schowengerdt et al. |
| D805,734 S | 12/2017 | Fisher et al. |
| 9,846,967 B2 | 12/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 9,933,684 B2 | 4/2018 | Brown et al. |
| 10,025,160 B2 | 7/2018 | Park et al. |
| 10,156,725 B2 | 12/2018 | TeKolste et al. |
| 10,191,288 B2 | 1/2019 | Singer et al. |
| 10,254,454 B2 | 4/2019 | Klug et al. |
| 10,260,864 B2 | 4/2019 | Edwin et al. |
| 10,261,318 B2 | 4/2019 | TeKolste et al. |
| 10,345,590 B2 | 7/2019 | Samec et al. |
| 10,345,591 B2 | 7/2019 | Samec et al. |
| 10,345,592 B2 | 7/2019 | Samec et al. |
| 10,345,593 B2 | 7/2019 | Samec et al. |
| 10,359,631 B2 | 7/2019 | Samec et al. |
| 10,365,488 B2 | 7/2019 | Samec et al. |
| 10,371,945 B2 | 8/2019 | Samec et al. |
| 10,371,946 B2 | 8/2019 | Samec et al. |
| 10,371,947 B2 | 8/2019 | Samec et al. |
| 10,371,948 B2 | 8/2019 | Samec et al. |
| 10,371,949 B2 | 8/2019 | Samec et al. |
| 10,379,350 B2 | 8/2019 | Samec et al. |
| 10,379,351 B2 | 8/2019 | Samec et al. |
| 10,379,353 B2 | 8/2019 | Samec et al. |
| 10,379,354 B2 | 8/2019 | Samec et al. |
| 10,386,639 B2 | 8/2019 | Samec et al. |
| 10,386,640 B2 | 8/2019 | Samec et al. |
| 10,386,641 B2 | 8/2019 | Samec et al. |
| 10,429,649 B2 | 10/2019 | Same et al. |
| 10,444,504 B2 | 10/2019 | Samec et al. |
| 10,451,877 B2 | 10/2019 | Samec et al. |
| 10,459,229 B2 | 10/2019 | Samec et al. |
| 10,459,231 B2 | 10/2019 | Miller et al. |
| 10,466,477 B2 | 11/2019 | Samec et al. |
| 10,466,478 B2 | 11/2019 | Klug et al. |
| 10,466,561 B2 | 11/2019 | Oh |
| 10,473,934 B2 | 11/2019 | Samec et al. |
| 10,527,850 B2 | 1/2020 | Samec et al. |
| 10,539,794 B2 | 1/2020 | Samec et al. |
| 10,539,795 B2 | 1/2020 | Samec et al. |
| 10,545,341 B2 | 1/2020 | Samec et al. |
| 10,564,423 B2 | 2/2020 | Samec et al. |
| 10,690,826 B2 | 6/2020 | Klug et al. |
| 10,775,628 B2 | 9/2020 | Samec et al. |
| 10,962,855 B2 | 3/2021 | Schowengerdt et al. |
| 10,969,588 B2 | 4/2021 | Samec et al. |
| 10,983,351 B2 | 4/2021 | Samec et al. |
| 11,036,109 B2 | 6/2021 | Oh |
| 11,106,041 B2 | 8/2021 | Miller et al. |
| 11,156,835 B2 | 10/2021 | Samec et al. |
| 2001/0009973 A1 | 7/2001 | Miwa |
| 2002/0036750 A1 | 3/2002 | Eberl et al. |
| 2002/0064341 A1 | 5/2002 | Fauver et al. |
| 2002/0072658 A1 | 6/2002 | Rice et al. |
| 2002/0097962 A1 | 7/2002 | Yoshimura et al. |
| 2002/0109819 A1 | 8/2002 | Tuval |
| 2002/0124843 A1 | 9/2002 | Skiba et al. |
| 2002/0126249 A1 | 9/2002 | Liang et al. |
| 2002/0167638 A1 | 11/2002 | Byun et al. |
| 2002/0172237 A1 | 11/2002 | Murry et al. |
| 2003/0007124 A1 | 1/2003 | Levine |
| 2003/0009156 A1 | 1/2003 | Levine |
| 2003/0020873 A1 | 1/2003 | Fink et al. |
| 2003/0071969 A1 | 4/2003 | Levine et al. |
| 2003/0081170 A1 | 5/2003 | Zolten |
| 2003/0147112 A1 | 8/2003 | Mukawa |
| 2003/0161573 A1 | 8/2003 | Ishida |
| 2003/0187503 A1 | 10/2003 | Lipshitz et al. |
| 2003/0210378 A1 | 11/2003 | Riza |
| 2004/0007465 A1 | 1/2004 | Goldberg et al. |
| 2004/0022888 A1 | 2/2004 | Sreenivasan et al. |
| 2004/0085648 A1 | 5/2004 | Tomono |
| 2004/0114242 A1 | 6/2004 | Sharp |
| 2004/0120647 A1 | 6/2004 | Sakata et al. |
| 2004/0129949 A1 | 7/2004 | Deliwala et al. |
| 2004/0130783 A1 | 7/2004 | Solomon |
| 2004/0136570 A1 | 7/2004 | Ullman et al. |
| 2004/0150141 A1 | 8/2004 | Chao et al. |
| 2004/0151466 A1 | 8/2004 | Crossman-Bosworth et al. |
| 2004/0156021 A1 | 8/2004 | Blum et al. |
| 2004/0184163 A1* | 9/2004 | Nishioka ............ G02B 17/0896 359/726 |
| 2004/0191429 A1 | 9/2004 | Patrick |
| 2004/0223113 A1 | 11/2004 | Blum et al. |
| 2004/0254438 A1 | 12/2004 | Chuck et al. |
| 2004/0257958 A1 | 12/2004 | Kimura et al. |
| 2005/0015120 A1 | 1/2005 | Seibel et al. |
| 2005/0036109 A1 | 2/2005 | Blum et al. |
| 2005/0042391 A1 | 2/2005 | Ryan et al. |
| 2005/0072959 A1 | 4/2005 | Moia et al. |
| 2005/0073577 A1 | 4/2005 | Sudo et al. |
| 2005/0099594 A1 | 5/2005 | Blum et al. |
| 2005/0122475 A1 | 6/2005 | Vilser et al. |
| 2005/0140924 A1 | 6/2005 | Blum et al. |
| 2005/0159662 A1 | 7/2005 | Imanishi et al. |
| 2005/0185135 A1 | 8/2005 | Blum et al. |
| 2005/0206844 A1 | 9/2005 | Blum et al. |
| 2005/0213027 A1 | 9/2005 | Blum et al. |
| 2005/0219460 A1 | 10/2005 | Blum et al. |
| 2005/0232530 A1 | 10/2005 | Kekas |
| 2005/0237485 A1 | 10/2005 | Blum et al. |
| 2005/0242771 A1 | 11/2005 | Blum et al. |
| 2005/0244476 A1 | 11/2005 | Burke et al. |
| 2005/0246783 A1 | 11/2005 | Christmann |
| 2005/0253112 A1 | 11/2005 | Kelly et al. |
| 2005/0270312 A1 | 12/2005 | Lad et al. |
| 2005/0270461 A1 | 12/2005 | Kitson et al. |
| 2005/0270481 A1 | 12/2005 | Blum et al. |
| 2005/0280777 A1 | 12/2005 | Dai |
| 2005/0286019 A1 | 12/2005 | Wiltberger et al. |
| 2006/0028436 A1 | 2/2006 | Armstrong |
| 2006/0033992 A1 | 2/2006 | Solomon |
| 2006/0098089 A1 | 5/2006 | Sofer |
| 2006/0114411 A1 | 6/2006 | Wei et al. |
| 2006/0114585 A1 | 6/2006 | Ho |
| 2006/0120247 A1 | 6/2006 | Noda et al. |
| 2006/0121358 A1 | 6/2006 | Rich et al. |
| 2006/0126179 A1 | 6/2006 | Levola |
| 2006/0132914 A1 | 6/2006 | Weiss et al. |
| 2006/0152525 A1 | 7/2006 | Woog |
| 2006/0157443 A1 | 7/2006 | Mei |
| 2006/0159395 A1 | 7/2006 | Hnatiw et al. |
| 2006/0186325 A1 | 8/2006 | Johnston et al. |
| 2006/0203196 A1 | 9/2006 | Van Heugten |
| 2006/0221448 A1 | 10/2006 | Nivon et al. |
| 2006/0227283 A1 | 10/2006 | Ooi et al. |
| 2007/0010748 A1 | 1/2007 | Rauch et al. |
| 2007/0027442 A1 | 2/2007 | Campin et al. |
| 2007/0031097 A1 | 2/2007 | Heikenfeld et al. |
| 2007/0081123 A1 | 4/2007 | Lewis |
| 2007/0115432 A1 | 5/2007 | Thibos |
| 2007/0121120 A1 | 5/2007 | Schachar |
| 2007/0139613 A1 | 6/2007 | Tanifuji et al. |
| 2007/0182915 A1 | 8/2007 | Osawa et al. |
| 2007/0200927 A1 | 8/2007 | Krenik |
| 2007/0229955 A1 | 10/2007 | Kawamura et al. |
| 2007/0236661 A1 | 10/2007 | Fukuma |
| 2007/0273957 A1 | 11/2007 | Zalevsky et al. |
| 2008/0043166 A1 | 2/2008 | Liu et al. |
| 2008/0043334 A1 | 2/2008 | Itzkovitch et al. |
| 2008/0091250 A1 | 4/2008 | Powell |
| 2008/0117289 A1 | 5/2008 | Schowengerdt et al. |
| 2008/0117384 A1 | 5/2008 | Inakagata et al. |
| 2008/0124787 A1 | 5/2008 | Christmann |
| 2008/0137031 A1 | 6/2008 | Hillis et al. |
| 2008/0169479 A1 | 7/2008 | Xu et al. |

(56) References Cited

U.S. PATENT DOCUMENTS

| | | |
|---|---|---|
| 2008/0212738 A1 | 9/2008 | Gertner et al. |
| 2008/0213904 A1 | 9/2008 | Sliwa et al. |
| 2008/0218685 A1 | 9/2008 | Ribak |
| 2008/0266530 A1 | 10/2008 | Takahashi et al. |
| 2008/0277601 A1 | 11/2008 | Phinney et al. |
| 2008/0309879 A1 | 12/2008 | Hirji |
| 2009/0024191 A1 | 1/2009 | Seibel et al. |
| 2009/0030299 A1 | 1/2009 | Naito et al. |
| 2009/0036955 A1 | 2/2009 | Han |
| 2009/0073428 A1 | 3/2009 | Magnus et al. |
| 2009/0082829 A1 | 3/2009 | Panken et al. |
| 2009/0141216 A1 | 6/2009 | Marrucci |
| 2009/0153796 A1 | 6/2009 | Rabner |
| 2009/0182291 A1 | 7/2009 | Eilat |
| 2009/0219486 A1 | 9/2009 | Bonnin et al. |
| 2009/0231545 A1 | 9/2009 | Peyman |
| 2009/0268162 A1 | 10/2009 | Stetson et al. |
| 2010/0004537 A1 | 1/2010 | Eilers et al. |
| 2010/0033676 A1 | 2/2010 | De Vries et al. |
| 2010/0069775 A1 | 3/2010 | Milgramm et al. |
| 2010/0142570 A1 | 6/2010 | Konttinen et al. |
| 2010/0149073 A1 | 6/2010 | Chaum et al. |
| 2010/0177113 A1 | 7/2010 | Gay et al. |
| 2010/0201944 A1 | 8/2010 | Lewis et al. |
| 2010/0207964 A1 | 8/2010 | Kimmel et al. |
| 2010/0214635 A1 | 8/2010 | Sasaki et al. |
| 2010/0220914 A1 | 9/2010 | Iwase et al. |
| 2010/0225876 A1 | 9/2010 | Escuti et al. |
| 2010/0245765 A1 | 9/2010 | Dyer et al. |
| 2010/0277803 A1 | 11/2010 | Pockett et al. |
| 2010/0283969 A1 | 11/2010 | Cooperstock et al. |
| 2010/0284090 A1 | 11/2010 | Simmonds |
| 2010/0289970 A1 | 11/2010 | Watanabe |
| 2010/0321781 A1 | 12/2010 | Levola et al. |
| 2011/0002143 A1 | 1/2011 | Saarikko et al. |
| 2011/0007277 A1 | 1/2011 | Solomon |
| 2011/0018903 A1 | 1/2011 | Lapstun et al. |
| 2011/0024950 A1 | 2/2011 | Kruglick |
| 2011/0049761 A1 | 3/2011 | Mataki |
| 2011/0063571 A1 | 3/2011 | Duffy |
| 2011/0075257 A1 | 3/2011 | Hua et al. |
| 2011/0109877 A1 | 5/2011 | Pujol Ramo et al. |
| 2011/0110207 A1 | 5/2011 | Katayama |
| 2011/0118556 A1 | 5/2011 | Siegel et al. |
| 2011/0178815 A1 | 7/2011 | Levett |
| 2011/0194058 A1 | 8/2011 | Amos et al. |
| 2011/0213664 A1 | 9/2011 | Osterhout et al. |
| 2011/0218456 A1 | 9/2011 | Graham et al. |
| 2011/0242306 A1 | 10/2011 | Bressler et al. |
| 2011/0242461 A1 | 10/2011 | Escuti et al. |
| 2011/0267663 A1 | 11/2011 | Murayama |
| 2011/0276312 A1 | 11/2011 | Shalon et al. |
| 2011/0299027 A1 | 12/2011 | Shantha et al. |
| 2012/0019703 A1 | 1/2012 | Thorn |
| 2012/0021140 A1 | 1/2012 | Dijksman et al. |
| 2012/0033306 A1 | 2/2012 | Valera et al. |
| 2012/0050685 A1 | 3/2012 | Bartlett et al. |
| 2012/0069413 A1 | 3/2012 | Schultz |
| 2012/0083718 A1 | 4/2012 | Alleman et al. |
| 2012/0086847 A1 | 4/2012 | Foster |
| 2012/0113092 A1 | 5/2012 | Bar-Zeev et al. |
| 2012/0127062 A1 | 5/2012 | Bar-Zeev et al. |
| 2012/0127426 A1 | 5/2012 | Backus et al. |
| 2012/0133890 A1 | 5/2012 | Rathjen |
| 2012/0147038 A1 | 6/2012 | Perez et al. |
| 2012/0147163 A1 | 6/2012 | Kaminsky |
| 2012/0162549 A1 | 6/2012 | Gao et al. |
| 2012/0172854 A1 | 7/2012 | Raymond et al. |
| 2012/0188637 A1 | 7/2012 | Joseph et al. |
| 2012/0194781 A1 | 8/2012 | Agurok |
| 2012/0206485 A1 | 8/2012 | Osterhout et al. |
| 2012/0206812 A1 | 8/2012 | Saito et al. |
| 2012/0212399 A1 | 8/2012 | Border et al. |
| 2012/0218301 A1 | 8/2012 | Miller |
| 2012/0226267 A1 | 9/2012 | Hauger |
| 2012/0236257 A1 | 9/2012 | Hillis et al. |
| 2012/0242918 A1 | 9/2012 | Valyukh et al. |
| 2012/0249956 A1 | 10/2012 | Narasimha-Iyer et al. |
| 2012/0274897 A1 | 11/2012 | Narasimha-Iyer et al. |
| 2012/0293773 A1 | 11/2012 | Publicover et al. |
| 2012/0307203 A1 | 12/2012 | Vendel et al. |
| 2012/0327330 A1 | 12/2012 | Takahashi et al. |
| 2012/0330387 A1 | 12/2012 | Ferraz Rigo et al. |
| 2013/0004485 A1 | 1/2013 | Bansal |
| 2013/0016292 A1 | 1/2013 | Miao et al. |
| 2013/0023966 A1 | 1/2013 | Depfenhart et al. |
| 2013/0051730 A1 | 2/2013 | Travers et al. |
| 2013/0070338 A1 | 3/2013 | Gupta et al. |
| 2013/0072916 A1 | 3/2013 | Bischoff et al. |
| 2013/0082922 A1 | 4/2013 | Miller |
| 2013/0100401 A1 | 4/2013 | Tabor |
| 2013/0117377 A1 | 5/2013 | Miller |
| 2013/0125027 A1 | 5/2013 | Abovitz |
| 2013/0144137 A1 | 6/2013 | Zalevsky et al. |
| 2013/0169909 A1 | 7/2013 | Srivastava et al. |
| 2013/0169930 A1 | 7/2013 | Calderia et al. |
| 2013/0177883 A1 | 7/2013 | Barnehama et al. |
| 2013/0184554 A1 | 7/2013 | Elsheikh et al. |
| 2013/0208234 A1 | 8/2013 | Lewis |
| 2013/0222384 A1 | 8/2013 | Futterer |
| 2013/0235440 A1 | 9/2013 | Takeda et al. |
| 2013/0242262 A1 | 9/2013 | Lewis |
| 2013/0242392 A1 | 9/2013 | Amirparviz et al. |
| 2013/0245505 A1 | 9/2013 | Khuri-Yakub et al. |
| 2013/0250207 A1 | 9/2013 | Bohn |
| 2013/0250380 A1 | 9/2013 | Fujikawa et al. |
| 2013/0250430 A1 | 9/2013 | Robbins et al. |
| 2013/0250431 A1 | 9/2013 | Robbins et al. |
| 2013/0253330 A1 | 9/2013 | Demos |
| 2013/0257312 A1 | 10/2013 | Maxik et al. |
| 2013/0261612 A1 | 10/2013 | Yokosuka et al. |
| 2013/0285885 A1 | 10/2013 | Nowatzyk et al. |
| 2013/0286053 A1 | 10/2013 | Fleck et al. |
| 2013/0296710 A1 | 11/2013 | Zuzak et al. |
| 2013/0300635 A1 | 11/2013 | White et al. |
| 2013/0308094 A1 | 11/2013 | Mohan et al. |
| 2013/0314765 A1 | 11/2013 | Padilla et al. |
| 2013/0314789 A1 | 11/2013 | Saarikko et al. |
| 2013/0314793 A1 | 11/2013 | Robbins et al. |
| 2013/0321265 A1 | 12/2013 | Bychkov et al. |
| 2013/0321747 A1 | 12/2013 | Kondo et al. |
| 2013/0322810 A1 | 12/2013 | Robbins |
| 2014/0009741 A1 | 1/2014 | Levien et al. |
| 2014/0016051 A1 | 1/2014 | Kroll et al. |
| 2014/0016093 A1 | 1/2014 | Korb et al. |
| 2014/0039309 A1 | 2/2014 | Harris et al. |
| 2014/0043320 A1 | 2/2014 | Tosaya et al. |
| 2014/0046291 A1 | 2/2014 | Harris et al. |
| 2014/0055740 A1 | 2/2014 | Spaulding et al. |
| 2014/0055746 A1 | 2/2014 | Nistico et al. |
| 2014/0058483 A1 | 2/2014 | Zao et al. |
| 2014/0063005 A1 | 3/2014 | Ahn et al. |
| 2014/0064655 A1 | 3/2014 | Nguyen et al. |
| 2014/0068513 A1 | 3/2014 | Sakagawa |
| 2014/0071539 A1 | 3/2014 | Gao |
| 2014/0098010 A1 | 4/2014 | Travis et al. |
| 2014/0104665 A1 | 4/2014 | Popovich et al. |
| 2014/0129259 A1 | 5/2014 | Seriani |
| 2014/0140653 A1 | 5/2014 | Brown et al. |
| 2014/0140654 A1 | 5/2014 | Brown et al. |
| 2014/0152531 A1 | 6/2014 | Murray et al. |
| 2014/0160283 A1 | 6/2014 | Hofman et al. |
| 2014/0168783 A1 | 6/2014 | Luebke et al. |
| 2014/0177023 A1 | 6/2014 | Gao et al. |
| 2014/0178861 A1 | 6/2014 | Duer |
| 2014/0186348 A1 | 7/2014 | Bansal et al. |
| 2014/0194702 A1 | 7/2014 | Tran |
| 2014/0194740 A1 | 7/2014 | Stein et al. |
| 2014/0198017 A1 | 7/2014 | Lamb et al. |
| 2014/0211322 A1 | 7/2014 | Bohn et al. |
| 2014/0218468 A1 | 8/2014 | Gao et al. |
| 2014/0218647 A1 | 8/2014 | Blum et al. |
| 2014/0232993 A1 | 8/2014 | Kim |
| 2014/0233879 A1 | 8/2014 | Gibson et al. |

(56) References Cited

U.S. PATENT DOCUMENTS

| | | |
|---|---|---|
| 2014/0240842 A1 | 8/2014 | Nguyen et al. |
| 2014/0267420 A1 | 9/2014 | Schowengerdt |
| 2014/0275935 A1 | 9/2014 | Walsh et al. |
| 2014/0285429 A1 | 9/2014 | Simmons |
| 2014/0285769 A1 | 9/2014 | Palanker et al. |
| 2014/0300695 A1 | 10/2014 | Smalley et al. |
| 2014/0306866 A1 | 10/2014 | Miller et al. |
| 2014/0306874 A1 | 10/2014 | Finocchio et al. |
| 2014/0313484 A1 | 10/2014 | Bogaert |
| 2014/0340390 A1 | 11/2014 | Lanman et al. |
| 2014/0354514 A1 | 12/2014 | Aronsson |
| 2014/0368793 A1 | 12/2014 | Friedman et al. |
| 2014/0372944 A1 | 12/2014 | Mulcahy et al. |
| 2014/0375790 A1 | 12/2014 | Robbins et al. |
| 2015/0002528 A1 | 1/2015 | Bohn et al. |
| 2015/0015879 A1 | 1/2015 | Papadopoulos et al. |
| 2015/0016777 A1 | 1/2015 | Abovitz et al. |
| 2015/0018781 A1 | 1/2015 | Rinderknect et al. |
| 2015/0035744 A1 | 2/2015 | Robbins et al. |
| 2015/0038869 A1 | 2/2015 | Simon et al. |
| 2015/0062500 A1 | 3/2015 | Park et al. |
| 2015/0088546 A1 | 3/2015 | Balram et al. |
| 2015/0103306 A1 | 4/2015 | Kaji et al. |
| 2015/0124073 A1 | 5/2015 | Fujishima et al. |
| 2015/0146147 A1 | 5/2015 | Choi et al. |
| 2015/0146301 A1 | 5/2015 | Wong et al. |
| 2015/0150444 A1 | 6/2015 | Bex et al. |
| 2015/0168731 A1* | 6/2015 | Robbins ................ G06T 19/006 345/8 |
| 2015/0178923 A1 | 6/2015 | Liang et al. |
| 2015/0178939 A1 | 6/2015 | Bradski et al. |
| 2015/0182118 A1 | 7/2015 | Bradbury et al. |
| 2015/0185475 A1 | 7/2015 | Saarikko et al. |
| 2015/0185503 A1 | 7/2015 | Tate et al. |
| 2015/0205126 A1* | 7/2015 | Schowengerdt ... G02B 26/0808 345/633 |
| 2015/0205182 A1 | 7/2015 | Leister |
| 2015/0222883 A1 | 8/2015 | Welch |
| 2015/0222884 A1 | 8/2015 | Cheng |
| 2015/0234188 A1 | 8/2015 | Lee |
| 2015/0234205 A1 | 8/2015 | Schowengerdt |
| 2015/0238362 A1 | 8/2015 | Chayet et al. |
| 2015/0241614 A1 | 8/2015 | Ide et al. |
| 2015/0241705 A1 | 8/2015 | Abovitz et al. |
| 2015/0248169 A1 | 9/2015 | Abovitz et al. |
| 2015/0248170 A1 | 9/2015 | Abovitz et al. |
| 2015/0248788 A1 | 9/2015 | Abovitz et al. |
| 2015/0248793 A1 | 9/2015 | Abovitz et al. |
| 2015/0248826 A1 | 9/2015 | Hahn et al. |
| 2015/0257735 A1 | 9/2015 | Ball et al. |
| 2015/0262424 A1 | 9/2015 | Tabaka et al. |
| 2015/0265146 A1 | 9/2015 | Bloom et al. |
| 2015/0268415 A1 | 9/2015 | Schowengerdt et al. |
| 2015/0277121 A1 | 10/2015 | Fridental |
| 2015/0277151 A1 | 10/2015 | Yadin et al. |
| 2015/0281630 A1 | 10/2015 | Melville et al. |
| 2015/0289762 A1 | 10/2015 | Popovich et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0313949 A1 | 11/2015 | Cutillo |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2015/0351690 A1 | 12/2015 | Toth et al. |
| 2015/0356781 A1 | 12/2015 | Miller |
| 2015/0356782 A1 | 12/2015 | Miller et al. |
| 2015/0378074 A1 | 12/2015 | Kollin et al. |
| 2016/0008169 A1 | 1/2016 | Yu |
| 2016/0011375 A1 | 1/2016 | Anderson et al. |
| 2016/0011419 A1 | 1/2016 | Gao |
| 2016/0026253 A1* | 1/2016 | Bradski ................ H04N 13/167 345/8 |
| 2016/0033698 A1 | 2/2016 | Escuti et al. |
| 2016/0033771 A1 | 2/2016 | Tremblay et al. |
| 2016/0041390 A1 | 2/2016 | Poon et al. |
| 2016/0055801 A1 | 2/2016 | Kim et al. |
| 2016/0066780 A1 | 3/2016 | Pamplona et al. |
| 2016/0067087 A1 | 3/2016 | Tedford et al. |
| 2016/0077338 A1 | 3/2016 | Robbins et al. |
| 2016/0085300 A1 | 3/2016 | Robbins et al. |
| 2016/0089023 A1 | 3/2016 | Takeno et al. |
| 2016/0097930 A1 | 4/2016 | Robbins et al. |
| 2016/0104453 A1 | 4/2016 | Borenstein et al. |
| 2016/0106591 A1 | 4/2016 | McArdle |
| 2016/0116739 A1 | 4/2016 | TeKolste et al. |
| 2016/0116979 A1 | 4/2016 | Border |
| 2016/0159276 A1 | 5/2016 | Thomas et al. |
| 2016/0167422 A1 | 6/2016 | Brehm et al. |
| 2016/0209648 A1 | 7/2016 | Haddick et al. |
| 2016/0216515 A1 | 7/2016 | Bouchier et al. |
| 2016/0256086 A1 | 9/2016 | Byrd et al. |
| 2016/0270648 A1 | 9/2016 | Freeman et al. |
| 2016/0270656 A1 | 9/2016 | Samec et al. |
| 2016/0282808 A1 | 9/2016 | Smalley |
| 2016/0287153 A1 | 10/2016 | Samec et al. |
| 2016/0320536 A1 | 11/2016 | Simmonds et al. |
| 2016/0324403 A1 | 11/2016 | Yeoh et al. |
| 2016/0324416 A1 | 11/2016 | Fateh |
| 2016/0379593 A1 | 12/2016 | Borenstein et al. |
| 2017/0000325 A1 | 1/2017 | Samec et al. |
| 2017/0000326 A1 | 1/2017 | Samec et al. |
| 2017/0000329 A1 | 1/2017 | Samec et al. |
| 2017/0007182 A1* | 1/2017 | Samec .................. A61B 3/113 |
| 2017/0007450 A1 | 1/2017 | Samec et al. |
| 2017/0007799 A1 | 1/2017 | Samec et al. |
| 2017/0010466 A1 | 1/2017 | Klug et al. |
| 2017/0010488 A1 | 1/2017 | Klug et al. |
| 2017/0078652 A1 | 3/2017 | Hua et al. |
| 2017/0112666 A1 | 4/2017 | Fateh |
| 2017/0127932 A1 | 5/2017 | Walsh et al. |
| 2017/0131595 A1 | 5/2017 | Yim et al. |
| 2017/0135896 A1 | 5/2017 | Snow |
| 2017/0205618 A1 | 7/2017 | Basset et al. |
| 2017/0269368 A1* | 9/2017 | Yun .................... B29D 11/0073 |
| 2017/0299869 A1 | 10/2017 | Urey et al. |
| 2017/0322419 A1 | 11/2017 | TeKolste et al. |
| 2017/0373459 A1 | 12/2017 | Weng et al. |
| 2018/0004289 A1 | 1/2018 | Wilson et al. |
| 2018/0011324 A1 | 1/2018 | Popovich |
| 2018/0046859 A1 | 2/2018 | Jarvenpaa |
| 2018/0113309 A1 | 4/2018 | Robbins et al. |
| 2018/0113310 A1 | 4/2018 | Rolland et al. |
| 2018/0136471 A1 | 5/2018 | Miller et al. |
| 2018/0136486 A1 | 5/2018 | Macnamara et al. |
| 2018/0143438 A1 | 5/2018 | Oh |
| 2018/0143470 A1 | 5/2018 | Oh et al. |
| 2018/0143485 A1 | 5/2018 | Oh |
| 2018/0143509 A1 | 5/2018 | Oh |
| 2018/0164645 A1 | 6/2018 | Oh et al. |
| 2018/0188528 A1 | 7/2018 | Browy |
| 2018/0188542 A1 | 7/2018 | Waldern et al. |
| 2018/0217395 A1 | 8/2018 | Lin et al. |
| 2018/0239147 A1 | 8/2018 | Schowengerdt |
| 2018/0239177 A1 | 8/2018 | Oh |
| 2018/0275350 A1 | 9/2018 | Oh |
| 2018/0275409 A1 | 9/2018 | Gao |
| 2018/0279870 A1 | 10/2018 | Walsh et al. |
| 2019/0033684 A1 | 1/2019 | Favalora et al. |
| 2019/0086674 A1 | 3/2019 | Sinay et al. |
| 2019/0121142 A1 | 4/2019 | Tekolste |
| 2019/0227211 A1 | 7/2019 | Klug et al. |
| 2019/0243141 A1 | 8/2019 | TeKolste |
| 2019/0243142 A1 | 8/2019 | Tekolste |
| 2019/0317352 A1* | 10/2019 | Saitoh ................. G02F 1/13362 |
| 2019/0391399 A1 | 12/2019 | Samec |
| 2020/0041796 A1 | 2/2020 | Samec et al. |
| 2020/0041797 A1 | 2/2020 | Samec |
| 2020/0057309 A1 | 2/2020 | Miller |
| 2020/0073123 A1 | 3/2020 | Martinez et al. |
| 2020/0081256 A1 | 3/2020 | Samec et al. |

(56) References Cited

U.S. PATENT DOCUMENTS

| | | | |
|---|---|---|---|
| 2020/0174304 A1 | 6/2020 | Oh | |
| 2021/0286180 A1 | 9/2021 | Samec | |
| 2021/0389593 A1 | 12/2021 | Miller | |

FOREIGN PATENT DOCUMENTS

| | | |
|---|---|---|
| CN | 101133348 B | 9/2010 |
| CN | 102683803 | 9/2012 |
| CN | 103207458 | 7/2013 |
| CN | 103959133 A | 7/2014 |
| CN | 104090372 A | 10/2014 |
| CN | 104145208 | 11/2014 |
| CN | 104434058 A | 3/2015 |
| CN | 104737061 A | 6/2015 |
| CN | 105911697 A | 8/2016 |
| CN | 205485048 U | 8/2016 |
| DE | 10 2017 126 908 A1 | 5/2019 |
| EP | 0 132 077 | 1/1985 |
| EP | 0 415 735 | 3/1991 |
| EP | 0 549 283 | 6/1993 |
| EP | 2 065 750 | 6/2009 |
| EP | 2 664 430 | 11/2013 |
| EP | 2 918 402 | 9/2015 |
| JP | 55-76323 | 6/1980 |
| JP | 62-269174 | 11/1987 |
| JP | H02-132411 A | 5/1990 |
| JP | 1991-84516 | 4/1991 |
| JP | H03-144419 A | 6/1991 |
| JP | 8-154924 A | 6/1996 |
| JP | 10-511190 | 10/1998 |
| JP | 2000-180785 | 6/2000 |
| JP | 2003-85289 | 3/2003 |
| JP | 2004-247947 | 9/2004 |
| JP | 2004-294654 A | 10/2004 |
| JP | 2005-316304 | 11/2005 |
| JP | 2005-316314 | 11/2005 |
| JP | WO 2004/088616 | 7/2006 |
| JP | 2009-268651 A | 11/2009 |
| JP | 2010-271565 | 12/2010 |
| JP | 2011-33400 | 2/2011 |
| JP | 2014-132328 | 7/2014 |
| JP | WO 2014/156167 | 10/2014 |
| JP | 2014-224846 | 12/2014 |
| JP | 2015-525365 A | 9/2015 |
| KR | 2013-0130735 | 12/2013 |
| WO | WO 1994/23334 | 10/1994 |
| WO | WO 2001/022741 | 3/2001 |
| WO | WO 2001/47463 | 7/2001 |
| WO | WO 2005/024469 | 3/2005 |
| WO | WO 2006/064301 | 6/2006 |
| WO | WO 2006/092758 | 9/2006 |
| WO | WO 2006/106501 | 10/2006 |
| WO | WO 2005/088384 | 1/2008 |
| WO | WO 2008/130555 | 10/2008 |
| WO | WO 2008/130561 | 10/2008 |
| WO | WO 2010/067114 | 6/2010 |
| WO | WO 2012/078410 | 6/2012 |
| WO | WO 2012/118573 | 9/2012 |
| WO | WO 2013/049248 | 4/2013 |
| WO | WO 2013/054115 | 4/2013 |
| WO | WO 2013/123461 | 8/2013 |
| WO | WO 2013/188464 | 12/2013 |
| WO | WO 2014/015378 | 1/2014 |
| WO | WO 2014/016403 | 1/2014 |
| WO | WO 2014/031961 | 2/2014 |
| WO | WO 2014/036537 | 3/2014 |
| WO | WO 2014/091204 | 6/2014 |
| WO | WO 2014/144940 | 9/2014 |
| WO | WO 2014/164901 | 10/2014 |
| WO | WO 2014/172252 | 10/2014 |
| WO | WO 2014/179857 | 11/2014 |
| WO | WO 2014/182769 | 11/2014 |
| WO | WO 2015/025251 | 2/2015 |
| WO | WO 2015/081313 | 6/2015 |
| WO | WO 2015/145119 | 10/2015 |
| WO | WO 2015/157482 | 10/2015 |
| WO | WO 2016/025443 | 2/2016 |
| WO | WO 2016/054092 | 4/2016 |
| WO | WO 2016/070188 | 5/2016 |
| WO | WO 2016/082031 | 6/2016 |
| WO | WO 2016/113533 | 7/2016 |
| WO | WO 2016/149416 | 9/2016 |
| WO | WO 2016/182974 | 11/2016 |
| WO | WO 2016/205249 | 12/2016 |
| WO | WO 2016/205256 | 12/2016 |
| WO | WO 2017/005608 | 1/2017 |
| WO | WO 2017/176898 | 10/2017 |
| WO | WO 2018/022521 | 2/2018 |
| WO | WO 2018/093730 | 5/2018 |
| WO | WO 2018/094079 | 5/2018 |
| WO | WO 2018/094093 | 5/2018 |
| WO | WO 2018/106963 | 6/2018 |
| WO | WO 2018/112101 | 6/2018 |
| WO | WO 2018/156779 | 8/2018 |
| WO | WO 2018/156784 | 8/2018 |
| WO | WO 2018/175343 | 9/2018 |
| WO | WO 2018/175488 | 9/2018 |
| WO | WO 2020/069026 | 4/2020 |

OTHER PUBLICATIONS

U.S. Notice of Allowance for U.S. Appl. No. 16/562,302, dated Apr. 29, 2020.
U.S. Office Action for U.S. Appl. No. 17/020,641, dated Jul. 9, 2021.
U.S. Appl. No. 15/902,927, filed Feb. 22, 2018, Oh.
European Extended Search Report, re EP Application No. 177779755, dated Nov. 13, 2019.
Invitation to Pay Additional Fees And, Where Applicable, Protest Fee for PCT Application No. PCT/US18/19250, dated May 2, 2018.
International Search Report and Written Opinion for PCT Application No. PCT/US18/19250, dated Jun. 29, 2018.
International Preliminary Report on Patentability for PCT Application No. PCT/US18/19250, dated Aug. 27, 2019.
Invitation to Pay Additional Fees And, Where Applicable, Protest Fee for PCT Application No. PCT/US18/19257, dated May 3, 2018.
International Search Report and Written Opinion for PCT Application No. PCT/US18/19257, dated Jul. 2, 2018.
International Preliminary Report on Patentability for PCT Application No. PCT/US18/19257, dated Aug. 27, 2019.
International Search Report and Written Opinion for PCT Application No. PCT/US17/26171, dated Jun. 21, 2017.
U.S. Office Action for U.S. Appl. No. 15/072,290, dated May 17, 2018.
U.S. Final Office Action for U.S. Appl. No. 15/072,290, dated Oct. 16, 2018.
U.S. Office Action for U.S. Appl. No. 15/072,290, dated Mar. 25, 2019.
U.S. Office Action for U.S. Appl. No. 15/072,290, dated Jan. 7, 2020.
Notice of Allowance for U.S. Appl. No. 15/072,290, dated Apr. 29, 2020.
Notice of Allowance for U.S. Appl. No. 15/072,290, dated Nov. 13, 2020.
U.S. Office Action for U.S. Appl. No. 15/269,351, dated Mar. 12, 2018.
U.S. Notice of Allowance for U.S. Appl. No. 15/269,351 dated Aug. 14, 2018.
U.S. Supplemental Notice of Allowance for U.S. Appl. No. 15/269,351 dated Aug. 28, 2018.
U.S. Supplemental Notice of Allowance for U.S. Appl. No. 15/269,351 dated Sep. 13, 2018.
U.S. Notice of Allowance for U.S. Appl. No. 15/269,351 dated Jan. 18, 2019.
U.S. Notice of Allowance for U.S. Appl. No. 15/269,351 dated Jun. 18, 2019.
U.S. Office Action for U.S. Appl. No. 15/269,335, dated Jun. 15, 2017.

(56) References Cited

OTHER PUBLICATIONS

U.S. Final Office Action for U.S. Appl. No. 15/269,335, dated Nov. 2, 2017.
U.S. Notice of Allowance for U.S. Appl. No. 15/269,335, dated Apr. 27, 2018.
U.S. Supplemental Notice of Allowance for U.S. Appl. No. 15/269,335, dated May 22, 2018.
U.S. Notice of Allowance for U.S. Appl. No. 15/269,335, dated Aug. 14, 2018.
U.S. Notice of Allowance for U.S. Appl. No. 15/269,335, dated Jan. 23, 2019.
U.S. Notice of Allowance for U.S. Appl. No. 15/269,335, dated Mar. 15, 2019.
U.S. Notice of Allowance for U.S. Appl. No. 15/269,335, dated Jun. 5, 2019.
U.S. Office Action for U.S. Appl. No. 15/269,374, dated Jan. 30, 2018.
U.S. Final Office Action for U.S. Appl. No. 15/269,374, dated Jun. 15, 2018.
U.S. Notice of Allowance for U.S. Appl. No. 15/269,374, dated Oct. 3, 2018.
U.S. Notice of Allowance for U.S. Appl. No. 15/269,374, dated Feb. 21, 2019.
Chiu et al.: "P-33: Large Area Self-aligning of Liquid Crystal Molecules induced by Nanoimprinting Lithography and a Multiple Function Film Made Therein," Eurodisplay, Sep. 20, 2005-Sep. 22, 2020, pp. 323-325.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikipedia, printed Oct. 3, 2017, in 14 pages. URL: https://en.wikipedia.org/wiki/Machine_learning.
Abdulhalim, I., "Liquid crystal devices tailored for specific imaging applications", SPIE Newsroom, published Sep. 5, 2014, in 4 pages. URL: http://spie.org/newsroom/5605-liquid-crystal-devices-tailored-for-specific-imaging-applications.
Aieta, F. et al., "Multiwavelength achromatic metasurfaces by dispersive phase compensation," Science, vol. 347, Issue 6228, Mar. 20, 2015, in 5 pages. URL: www.sciencemag.org.
Anthony, S., "MIT releases open-source software that reveals invisible motion and detail in video", Extreme Tech, Feb. 28, 2013, as accessed Aug. 4, 2017, in 5 pages.
Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.
ARToolKit: https://web.archive.org/web/20051013062315/http://www.hitl.washington.edu:80/artoolkit/documentation/hardware.htm, archived Oct. 13, 2005.
Aubry M. et al., "Seeing 3D chairs: exemplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.
Azuma, "A Survey of Augmented Reality," Teleoperators and Virtual Environments 6, (Aug. 4, 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.
Bartsch, D. et al., "Confocal Scanning Infrared Laser Ophthalmoscopy for Indocyanine Green Angiography", American Journal of Ophthalmology, vol. 120, Nov. 1995, in 10 pages.
Bimber, et al., "Spatial Augmented Reality—Merging Real and Virtual Worlds," 2005 https://web.media.mit.edu/~raskar/book/BimberRaskarAugmentedRealityBook.pdf.
Black J.M. et al., "The Measurement and Treatment of Suppression in Amblyopia", J. Vis. Exp. (JoVE) Dec. 14, 2012; 70:e3927 in 7 pages.
Carreira J. et al., "Human Pose Estimation with Iterative Error Feedback", In Proceedings of the IEEE Conference on Computer Vision and Pattern Recognition, Jun. 27-30, 2016, pp. 4733-4742.
Chan, E. et al., "Pulse oximetry: Understanding its basic principles facilitates appreciation of its limitations", Respiratory Medicine, Mar. 13, 2013, vol. 107, in 11 pages. URL: http://www.sciencedirect.com/science/article/pii/S0954611113000053.
Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.
Childs, et al.: "Retinal imaging: a first report of the retinal microvasculature in acute mild traumatic brain injury," Eur J Emerg Med., vol. 2, No. 5, Aug. 28, 2014, in 2 pages.
Choi, Y. et al.: "Determination of Surface Nematic Liquid Crystal Anchoring Strength Using Nano-scale Surface Grooves," Optical Society of America, May 2013, in 10 pages.
Choy et al., "3D-R2N2: A Unified Approach for Single and Multi-view 3D Object Reconstruction", arXiv; e-print arXiv:1604.00449v1, Apr. 2, 2016 in 17 pages.
Collet et al., "The MOPED framework: Object Recognition and Pose Estimation for Manipulation", The International Journal of Robotics Research. (Sep. 2011) 30(10):1284-306; preprint Apr. 11, 2011 in 22 pages.
Crawford, et al.: "Liquid-crystal diffraction gratings using polarization holography alignment techniques," Journal of Applied Physics 98, 123102, 2005.
Creel, D., "The Electroretinogram and Electro-oculogram: Clinical Applications", Webvision, updated Jul. 14, 2015, in 25 pages. URL: http://webvision.med.utah.edu/book/electrophysiology/the-electroretinogram-clinical-applications/.
Cunningham et al., "A plastic colorimetric resonant optical biosensor for multiparallel detection of label-free biochemical interactions," Sensors and Actuators B, vol. 85, 2190226, Jul. 2002, in 8 pages.
Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).
Dierking, I.: "Chiral Liquid Crystals: Structures, Phases, Effects," Symmetry, (Jun. 2014) 6(2): 444-472.
"Metamaterials". Duke University. Center for Metamaterials and Integrated Plasmonics. May 11, 2015 (Retrieved from the internet Aug. 12, 2016). URL: http://web.archive.org/web/20150511045547/http://metamaterials.duke.edu/research/metamaterials.
EnChroma, "Technology", retrieved Sep. 6, 2016, in 10 pages. URL: http://enchroma.com/technology/.
Escuti, M. et al., "39.4: Polarization-independent switching with high contrast from a liquid crystal polarization grating", SID Symposium Digest, vol. 37, pp. 1443-1446, Jun. 2006, in 5 pages.
Escuti, M. et al., "Polarization-Independent LC Microdisplays Using Liquid Crystal Polarization Gratings: A Viable Solution", ILCC presentation, Jul. 1, 2008, in 15 pages.
Escuti J., "Polarization-Independent Modulation & Simplified Spectropolarimetry Using LC Polarization Gratings," paper #39.4, posters P-209, P-167, SID Symposium Digest, 2006.
Everingham M. et al., "The PASCAL Visual Object Classes (VOC) Challenge", Int J Comput Vis (Jun. 2010) 88(2):303-38.
Felleman, D. et al., "Distributed Hierarchical Processing in the Primate Cerebral Corte ", Cerebral Corte , Jan./Feb. 1991, in 47 pages. URL: http://cercor.o fordjournals.org/content/1/1/1.1.full.pdf+html.
Flusberg, et al., "Fiber-optic fluorescence imaging," Nat Methods. Dec. 2005; 2(12): 941-950.
Gear, C. et al.: "Engineered Liquid Crystal Anchoring Energies with Nanopatterned Surfaces," Optical Society of America, Jan. 2015, in 8 pages.
Goldman-Rakic, P. et al., "Preface: Cerebral Cortex Has Come of Age", Cerebral Cortex , vol. 1, Jan. 1991, in 2 pages. URL: http://cercor.o fordjournals.org/content/1/1/1.1.full.pdf+html.
Haller et al., "Better Imaging, Better Detection and Treatment", Medscape, Dec. 28, 2015, in 3 pages. URL: http://www.medscape.com/viewarticle/856387_print.

(56) References Cited

OTHER PUBLICATIONS

Hayes, T., "EyeSelfie Gives Patients Control Over Retinal Imaging", Optics.org, Jul. 8, 2015, in 2 pages. URL: http://optics.org/news/6/7/5.

Heiting, G., "Contrast Sensitivity Testing", All About Vision, updated Jan. 2016, in 4 pages. URL: http://www.allaboutvision.com/eye-eam/contrast-sensitivity.htm.

Hoerauf, et al., "Slit-lamp-adapted optical coherence tomography of the anterior segment," 2000, Graefe's Arch Clin Exp Opthalmol, Springer-Verlag, pp. 238-18 (Year: 2000).

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Jacques, S.L., "Optical properties of biological tissues: a review", Phys. Med. Biol., published May 10, 2013, vol. 58, R37, in 28 pages. URL: http://iopscience.iop.org/article/10.1088/0031-9155/58/11/R37.

Kar A. et al., "Category-specific object reconstruction from a single image", in *Proceedings of the IEEE Conference on Computer Vision and Pattern Recognition*. Jun. 7-12, 2015 (pp. 1966-1974).

Kern, "Bifocal, electrically switched intraocular and eyeglasses molecular lenses," Proceedings vol. 601, Ophthalmic Optics, Cannes, France Dec. 3-4, 1985.

Kim, J. et al., "Wide-angle, nonmechanical beam steering with high throughput utilizing polarization gratings", Applied Optics, vol. 50, No. 17, Jun. 10, 2011, in 4 pages.

Kirkpatrick, C. et al., "How to Perform a Basic Cover Test in Ocular Misalignment or Strabismus", Apr. 24, 2015, in 4 pages. URL: http://www.eyerounds.org/video/basic-cover-test.htm, Apr. 24, 2015.

Komanduri, et al., "Multi-twist retarders: broadband retadation control using self-aligning reactive liquid crystal layers," Optical Society of America, Optics Express 404, vol. 21, No. 1, Jan. 14, 2013.

Komanduri, R. et al., "18:3: Late-News Paper: Polarization Independent Liquid Crystal Microdisplays", SID Digest, vol. 39, No. 1, pp. 236-239, May 2008, in 4 pages.

Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.

Komanduri, R. et al., "Elastic Continuum Analysis of the Liquid Crystal Polarization Grating", Physical review. E, Statistical, nonlinear, and soft matter physics, May 25, 2007, in 8 pages.

Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.

Komanduri, R. et al., "Polarization-independent modulation for projection displays using small-period LC polarization gratings", Journal of the Society for information display, vol. 15, No. 8, pp. 589-594, Aug. 2007, in 7 pages.

Kovacs, I. et al., "When the brain changes its mind: Interocular grouping during binocular rivalry", Proc. Natl. Acad. Sci., Dec. 1996, vol. 93, in 4 pages. URL: http://www.pnas.org/content/93/26/15508.full.pdf.

Kurioz, Y. et al.: "P-128: Orientation of a Reactive Mesogen on Photosensitive Surface," Society for Information Display (SID) Symposium Digest of Technical Papers, May 2007, in 3 pages.

La Trobe University, "Maddox Rod Test (Tutorial)", YouTube, published Sep. 24, 2014, in 1 page. URL: https://www.youtube.com/watch?v=Y4Gm_GErosw.

Lee, et al., Negative dispersion of birefringence in two-dimensionally self-organized smectic liquid crystal and monomer thin film, Optics Letters, vol. 39, No. 17, Sep. 1, 2014.

Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.

Lin, D. et al., "Dielectric gradient metasurface optical elements", Science, vol. 345, Issue 6194, Jul. 18, 2014, in 6 pages.

Lin, D. et al., "Supplementary Materials for Dielectric gradient metasurface optical elements", Science, vol. 345, Issue 6194, Jul. 18, 2014, in 22 pages.

Lin, R. et al. Molecular-Scale soft imprint lithography for alignment layers in liquid crystal devices; Nano Letters, vol. 7, No. 6; Publication [online], May 23, 2007 [retrieved Feb. 7, 2018], Retrieved from the Internet: URL:https://pubs.acs.org/doi/abs/10.1021/nl070559y; pp. 1613-1621.

Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.

Mansurov, N., "What is Chromatic Aberration?", Photography Life, Nov. 8, 2011, in 14 pages. URL: https://photographylife.com/what-is-chromatic-aberration.

Martin, B., "In-Depth: Cognitive Behavioral Therapy", Psych Central, published on May 17, 2016, retrieved on Oct. 13, 2016, in 8 pages. URL: http://psychcentral.com/lib/in-depth-cognitive-behavioral-therapy/.

MIT Media Lab Camera Culture, "Snapshots—Camera Culture News", Aug. 18, 2015, in 5 pages.

National Instruments, "Electrooculogram Measurement", published Jul. 29, 2010, in 2 pages. URL: http://www.ni.com/white-paper/11958/en/.

Nikolova et al., "Diffraction Efficiency and Selectivity of Polarization Holographic Recording", Optica Acta: Int'l J Optics (1984) 31(5):579-588.

Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.

Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.

Oh, C. et al., "Numerical analysis of polarization gratings using the finite-difference time-domain method", Physical review A, vol. 76, Oct. 12, 2007, in 8 pages.

Oh, C. et al., "Polarization-Independent Modulation using Standard LCDs and Polymer PGs", 2008, in 6 pages.

Oh, C. et al., 16.2: Polarization-Independent Modulation Using Standard Liquid Crystal Microdisplays and Polymer Polarization Gratings, IDRC, 2008, in 4 pages.

Oh et al., "Polarization-Independent Modulation Using Standard Liquid Crystal Microdisplays and Polymer Polarization Gratings," NC State University; International Display Research Conference, vol. 28, pp. 298-301, 2008. in 16 pages.

Optics and optical instruments—Ophthalmic optics—Formers, International Standard, ISO 11380, First Edition, Oct. 1, 1994.

Patil, et al., "Slit-lamp adapted, video-correlated real-time optical coherence tomorgraphy of the anterior segment," 2002, OSA/BoSD, AOIMP, TLA 2002, pp. 322-324 (Year: 2002).

Paton, J. et al., "The primate amygdala represents the positive and negative value of stimuli during learning", Nature, Feb. 16, 2006, vol. 439, in 6 pages. URL: http://www.nature.com/nature/journal/v439/n7078/full/nature04490.html.

Radhakrishnan, et al., "Real-time optical coherence tomography of the anterior segment using hand-held and slit-lapm adapted systems," 2002, Proc. SPIE vol. 4619, pp. 227-229 (Year: 2002).

Robertson, C. et al., "Reduced GABAergic Action in the Autistic Brain", Current Biology, 2016, in 7 pages. URL: http://www.cell.com/current-biology/abstract/S0960-9822(15)01413-x.

Salomon, R. et al., "The Insula Mediates Access to Awareness of Visual Stimuli Presented Synchronously to the Heartbeat", Journal of Neuroscience, May 6, 2016, vol. 36(18), in 13 pages. URL: http://www.jneurosci.org/content/36/18/5115.short.

Scheeline, et al., "Stacked Mutually Rotated Diffraction Gratings as Enablers of Portable Visible Spectrometry," Appl. Spectrosc. 70, 766-777, May 11, 2016.

Tan, J., "Eye Clinic Tests New Myopia Treatment Using Vitamin B2 and Ultraviolet Light", The New Paper, published Dec. 28, 2015, in

(56) References Cited

OTHER PUBLICATIONS 5 pages. URL: http://www.tnp.sg/news/singaporenews/eyeclinictestsnewmyopiatreatmentusingvitaminb2andultravioletlight.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Wikipedia Blind spot (vision), archived Jun. 9, 2016, in 2 pages. URL: https://web.archive.org/web/20160609224858/https:en.wikipedia.org/wiki/Blind_spot(vision).
Wikipedia: "Deep Learning", Wikipedia, printed Apr. 27, 2016, in 40 pages. URL: https://en.wikipedia.org/wiki/Deep_learning#Deep_neural_networks.
Wikipedia: "Deep Learning", Wikipedia, printed Oct. 3, 2017, in 23 pages. URL: https://en.wikipedia.org/wiki/Deep_learning.
Xiang Y. et al., "Data-Driven 3D Vox el Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems 25. F. Pereira et al. [Eds.] Dec. 2012 (pp. 746-754).
Yang et al. Negative dispersion of birefringence of smectic liquid crystal-polymer compostie: dependence on the constituent molecules and temperature, Optical Society of America, Optics Express 2466, vol. 23, No. 3, Feb. 9, 2015.
Yim et al., "On the Modeling of Light Interactions with Human Blood", Natural Phenomena Simulation Group, D.R. Cheriton School of Computer Science, University of Waterloo Technical Report CS-2011-30, Dec. 2011, in 19 pages. URL: https://cs.uwaterloo.ca/research/tr/2011/CS-2011-30.pdf.
Yu, N. et al., "Flat optics with designer metasurfaces", Review Article; Nature Materials, (Feb. 2014) 13: 139-150.
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.
Eyenetra, NETRA Refraction For Anyone Anywhere, https://web.archive.org/web/20150617231941/http://eyenetra.com/product-netra.html as archived Jun. 17, 2015. "The Blink Process", https://web.archive.org/web/20160328164326/https://vimeo.com/117414944 as archived Mar. 28, 2016.
Karp, Andrew, "How wearables and eye tracking are adding new dimensions to ocular health", Vision Monday, http://visionmonday.com/article/from-eye2-to-eyecare/, published Jul. 20, 2015.
Wikipedia, Pinhole Glasses, https://web.archive.org/web/20151211100505/https://en.wikipedia.org/wiki/Pinhole_glasses as archived Dec. 11, 2015.
The Free Dictionary by Farlex, Scheiner's Experiment, https://web.archive.org/web/20150923200056/http://medical-dictionary.thefreedictionary.com/Scheiner's+experiment as archived Sep. 23, 2015.
All About Vision, Wavefront Technology in Eye Exams, https://web.archive.org/web/20160314205244/https://www.allaboutvision.com/eye-exam/wavefront.htm as archived Mar. 14, 2016.
Wikipedia, Retinal Scan, https://web.archive.org/web/20160108023330/https://en.wikipedia.org/wiki/Retinal_scan as archived Jan. 8, 2016.
Wikipedia, Accommodation Reflex, https://web.archive.org/web/20160312224519/https://en.wikipedia.org/wiki/Accommodation_reflex as archived Mar. 12, 2016.
Wikipedia, Optical Coherence Tomography, https://web.archive.org/web/20160309023843/https://en.wikipedia.org/wiki/Optical_coherence_tomography as archived Mar. 9, 2016.
Tavakoli M, Hossain P, Malik RA. Clinical applications of corneal confocal microscopy. Clin Ophthalmol. Jun. 2008;2(2):435-45.
Wikipedia, Two-Photon Excitation Microscopy, https://web.archive.org/web/20160124131037/https://en.wikipedia.org/wiki/Two-photon_excitation_microscopy as archived Jan. 24, 2016.
So, Peter TC, "Two-photon Fluorescence Light Microscopy" Massachusetts Institute of Technology, Encyclopedia of Life Sciences. Published 2002.
Wikipedia, Optogenetics, https://web.archive.org/web/20160304035328/https://en.wikipedia.org/wiki/Optogenetics as archived Mar. 4, 2016.
Wikipedia, Scanning laser ophthalmoscopy, https://web.archive.org/web/20150603044310/https://en.wikipedia.org/wiki/Scanning_laser_ophthalmoscopy as archived Jun. 3, 2015.
Tonometry Presentation published Apr. 22, 2015 available at http://www.slideshare.net/mandakini000/tonometry-47300598.
Reichert Technologies, Tonometry, http://web.archive.org/web/20160716015310/http://www.reichert.com/product_details.cfm?pcId=304&skuId=4376&skuTk=1286486472 as archived Jul. 16, 2016. a. Reichert—Eye Care, "The Role of Corneal Hysteresis in Glaucoma Progression with Ocular Response Analyzer", YouTube, published Jul. 17, 2015, in 7 pages (with video transcription). https://www.youtube.com/watch?v=UnUmXoS3h54 b. Reichert—Eye Care, "Corneal Hysteresis: Clinical Relevance in Glaucoma in 90 Seconds", YouTube, published May 13, 2015, in 4 pages (with video transcription). https://www.youtube.com/watch?v=4h_0G0vlVxU c. Reichert—Eye Care, "Corneal Hysteresis and IOPcc: Clinical Applications in Glaucoma", YouTube, published Mar. 12, 2015, in 14 pages (with video transcription). https://www.youtube.com/watch?v=qOLcpWB2MbM d. Reichert—Eye Care, "Understanding Corneal Hysteresis in Glaucoma", YouTube, published Apr. 23, 2010, in 13 pages (with video transcription). https://www.youtube.com/watch?v=2v9w8ATblqU.
BiomedEngg, "How does ocular response analyser works", YouTube, published Mar. 14, 2014, in 15 pages (with video transcription). URL: https://www.youtube.com/watch?v=gfHr_XC0cYI.
Willekens et al., Ophthalmic Research, Review on Dynamic Contour Tonometry and Ocular Pulse Amplitude, Published Dec. 10, 2015.
Retinal Oximetry, http://web.archive.org/web/20170703083202/http://eyewiki.org/Retinal_Oximetry as archived Jul. 3, 2017.
Introduction to Ultrasound, https://web.archive.org/web/20160124030833/http://www.brooksidepress.org/Products/OBGYN_101/MyDocuments4/Ultrasound/basic_ultrasound.htm as archived Jan. 24, 2016.
Lee et al., "Scanning Fiber Endoscopy with Highly Flexible, 1-mm Catheterscopes for Wide-Field, Full-Color Imaging", J Biophotonics: Jun. 2010 3(5-6): 385-407.
Ibrahim et al., "Assessment of oxygen saturation in retinal vessels of normal subjects and diabetic patients with and without retinopathy using Flow Oximetry System" Quantitative Imaging In Medicine and Surgery, vol. 5, No. 1, Feb. 2015. https://web.archive.org/web/20151019073656/http://www.amepc.org/qims/article/view/5359/6245 as archived Oct. 19, 2015.
Wikipedia, Electroretinography, https://web.archive.org/web/20160117075807/https://en.wikipedia.org/wiki/Electroretinography as archived Jan. 17, 2016.
Wikipedia, Binocular Rivalry, https://web.archive.org/web/20160112024410/https://en.wikipedia.org/wiki/Binocular_rivalry as archived Jan. 12, 2016.
Cedars-Sinai, "Keith Black, MD & The First Eye Test for Alzheimer's | Cedars-Sinai", YouTube, published Nov. 23, 2015, in 8 pages (with video transcription). https://www.youtube.com/watch?v=XpzkZLo3yQk.
Koronyo-Hamaoui et al., "Identification of amyloid plaques in retinas from Alzheimer's patients and noninvasive in vivo optical imaging of retinal plaques in a mouse model". Neuroimage; Jan. 2011; 54 Suppl 1:S204-17. doi: 10.1016/j.neuroimage.2010.06.020.
Johnsen, M. "Contact lens with built-in sensor can measure risk of glaucoma progression, study finds" dated Feb. 4, 2016 https://web.archive.org/web/20160205100510/http://www.drugstorenews.com/article/contact-lens-built-sensor-can-measure-risk-glaucoma-progression-study-finds as archived Feb. 5, 2016.
Wikipedia, Cover Test, https://web.archive.org/web/20151204195654/https://en.wikipedia.org/wiki/Cover_test as archived Dec. 4, 2015.
Wikipedia, Red-eye effect, https://web.archive.org/web/20160113194839/https://en.wikipedia.org/wiki/Red-eye_effect as archived Jan. 13, 2016.

(56) References Cited

OTHER PUBLICATIONS

Mukamal, R. "Photos Can Help Diagnose Children's Eye Problems and Save Sight" dated Jul. 28, 2014, https://web.archive.org/web/20160307060813/http://www.aao.org/eye-health/tips-prevention/diagnosing-children-from-photographs as archived Mar. 7, 2016.
Ophthalmoscope, https://web.archive.org/web/20150826030102/http://www.yorku.ca/eye/ophthal.htm as archived Aug. 26, 2015.
Medical Device Depot, Inc. Welch Allyn Binocular Indirect Ophthalmoscopes, https://web.archive.org/web/20150909051129/https://www.medicaldevicedepot.com/Welch-Allyn-Binocular-Indirect-Ophthalmoscopes-p/wabio.htm?1=1&CartID=0 as archived Sep. 9, 2015.
Roux, P. Ophthalmoscopy for the general practitioner, South African Family Practice, Published Aug. 15, 2014 available at https://doi.org/10.1080/20786204.2004.10873079.
Wikipedia, Electrooculography, https://web.archive.org/web/20160118002107/https://en.wikipedia.org/wiki/Electrooculography as archived Jan. 18, 2016.
Plainis et al., CRSTEurope, "The Physiologic Mechanism of Accommodation", Apr. 2014, http://crstodayeurope.com/2014/04/the-physiologic-mechanism-of-accommodation.
Tyson, J., "Lasik Surgery" https://web.archive.org/web/20150906190835/http://health.howstuffworks.com/medicine/surgeries-procedures/lasik6.htm as archived Sep. 6, 2015.
Carleton Optical, "Vision Screening | PlusoptiXA09 Paediatric Binocular Autorefractor", https://web.archive.org/web/20170326175824/http://carletonltd.com/products/sight-testing-and-refraction/vision-screening/plusoptix-paediatric-binocular-autorefractoras archived Mar. 26, 2017.
Wikipedia, Confocal Microscopy, https://web.archive.org/web/20151121002858/https://en.wikipedia.org/wiki/Confocal_microscopy as archived Nov. 21, 2015.
Bennett, T., "Scanning Laser Ophthalmoscopy" https://web.archive.org/web/20151107054433/http://www.opsweb.org/?page=SLO as archived Nov. 7, 2015.
Browne, J. "Direct Ophthalmoscope: The Ultimate Pediatric Screening Tool" dated Jul. 9, 2013 https://web.archive.org/web/20150709202404/http://www.optometrystudents.com/direct-ophthalmoscope-the-ultimate-pediatric-screening-tool/#sthash.O3Ed3a58.dpuf as archived Jul. 9, 2015.
Pietrangelo, A., "Eye and Orbit Ultrasound" https://web.archive.org/web/20160216123839/http://www.healthline.com/health/eye-and-orbit-ultrasound as archived Feb. 16, 2016.
Wikipedia, Non-Contact Ultrasound, https://web.archive.org/web/20151126014623/https://en.wikipedia.org/wiki/wiki/Non-contact_ultrasound as archived Nov. 26, 2015.
Eye Tech Care, Unique Technology for Non-Invasive Treatment, https://web.archive.org/web/20160121200140/http://www.eyetechcare.com/en/treatment/the-medical-device/ as archived Jan. 21, 2016.
Schwartz, et al. Therapeutic ultrasound for glaucoma: clinical use of a low-frequency low-power ultrasound device.
Fyola, "Ultrasound Therapy With Fyola Facial Machine", http://www.fyola.com/facialtreatment/ultrasound-facial.shtml printed Feb. 6, 2019.
Arterial Ultrasound Scan, https://web.archive.org/web/20160301083227/http://hyperphysics.phy-astr.gsu.edu/hbase/sound/usound2.html as archived Mar. 1, 2016.
NTNU, Cardiac Ultrasound, https://web.archive.org/web/20150915045624/https://www.ntnu.edu/isb/echocardiography as archived Sep. 15, 2015.
Convex Lens http://web.archive.org/web/20160426123327/http://cbakken.net/obookshelf/cvreal.html as archived Apr. 26, 2016.
The Free Dictionary, Accommodation, https://web.archive.org/web/20150906042456/http://medical-dictionary.thefreedictionary.com/accommodation as archived Sep. 6, 2015.
Wikipedia, Bagolini Striated Glasses Test, https://web.archive.org/web/20151201023513/https://en.wikipedia.org/wiki/Bagolini_Striated_Glasses_Test as archived Dec. 1, 2015.
Worth 4-dot test, https://www.aao.org/bcscsnippetdetail.aspx?id=8200e4a2-f7ee-47f4-b8b7-985b30b52f67 printed Feb. 11, 2019.
Lam, Steven, "Orthoptical Clinical Skills—Assessment of Binocular", YouTube, published Sep. 2, 2013, in 14 pages (with video transcription). https://www.youtube.com/watch?v=iZYB3UON0HM.
American Academy of Ophthalmology, EyeWiki, Worth 4 dot, https://web.archive.org/web/20160305174751/http://eyewiki.aao.org/Worth_4_dot as archived Mar. 5, 2016.
Wikipedia, Worth 4 dot test, https://web.archive.org/web/20150114111313/http://en.wikipedia.org/wiki/Worth_4_dot_test as archived Jan. 14, 2015.
GuldenOpthalmics, "Trial Frame Multi-Pinhole Occluder", http://web.archive.org/web/20180321141447/http://www.guldenophthalmics.com/products/index.php/trial-lens-multi-pinhole-occluder.html as archived Mar. 21, 2018.
MedlinePlus, U.S. National Library for Medicine, "Fluorescein eye stain", https://web.archive.org/web/20160105060436/https://www.nlm.nih.gov/medlineplus/ency/article/003845.htm as archived Jan. 5, 2016.
Labrigger, "Fast Z-Galvo for 3D Two-Photon Imaging", https://web.archive.org/web/20151031101132/http://labrigger.com/blog/2012/02/17/fast-z-galvo-for-3d-two-photon-imaging/ as archived Oct. 31, 2015.
Rosen et al., "Multidimensional en-Face OCT imaging of the retina," Opt. Express 17, 4112-4133 (2009).
Laboratory for Functional Optical Imaging, "Imaging Technology", https://web.archive.org/web/20151224023624/http://orion.bme.columbia.edu/~hillman/Instrumentation.html, Hillman Lab 2012, Columbia University Department of Biomedical Engineering, New York, as archived Dec. 24, 2015 in 6 pages.
Vision-Systems, "Leading Edge Views: 3-D Imaging Advances Capabilities of Machine Vision: Part I", http://www.vision-systems.com/articles/print/volume-17/issue-4/departments/leading-edge-views/3-d-imaging-advances-capabilities-of-machine-vision-part-i.html ,Apr. 1, 2012.
bsigroup.com, "Ophthalmic Devices", https://web.archive.org/web/20160118063943/http://www.bsigroup.com/en-GB/medical-devices/technologies/ophthalmic/ as archived Jan. 18, 2016 in 10 pages.
WebMD, "Laser Photocoagulation for Diabetic Retinopathy", https://web.archive.org/web/20160104133456/http://www.webmd.com/diabetes/laser-photocoagulation-for-diabetic-retinopathy as archived Jan. 4, 2016 in 4 pages.
Women's and Children's Hospital, "Electro-retinography & Electro-oculography", https://web.archive.Org/web/20160304171451/http://www.wch.sa.gov.au/services/az/divisions/paedm/neurology/electro.html as archived Mar. 4, 2016 in 5 pages.
Telescope-optics.net, "Eye Chromatism", https://web.archive.org/web/20160310131809/http://www.telescope-optics.net/eye_chromatism.htm as archived Mar. 10, 2016 in 5 pages.
"Eye Chromatism", Telescope-Optics.net, archived Mar. 10, 2016, in 5 pages. URL: http://web.archive.org/web/20160310131809/http://www.telescopeoptics.net/eye_chromatism.htm.
Wikipedia, "Slit lamp", https://web.archive.org/web/20160224172608/https://en.wikipedia.org/wiki/Slit_lamp as archived Feb. 24, 2016 in 5 pages.
Mordant et al., "Spectral imaging of the retina", Eye (2011) 25, pp. 309-320.
Mordant et al., "Validation of Human Whole Blood Oximetry, Using a Hyperspectral Fundus Camera with a Model Eye", Investigative Opthalmology & Visual Science, Apr. 2011, vol. 52, No. 5, pp. 2851-2859.
Villanueva et al., "A Novel Gaze Estimation System With One Calibration Point", IEEE Transactions on Systems, Man, and Cybernetics—Part B: Cybernetics, vol. 38, No. 4, Aug. 2008, pp. 1123-1138.
Levoy et al., "Light Field Microscopy", ACM Transaction on Graphics 25(3), Proc. SIGGRAPH 2006 in 11 pages.
Malara, Marilyn, "Simple eye test may detect autism in children sooner", http://www.upi.com/Health_News/2016/04/02/Simple-eye-test-ma . . . , UPI.com in 3 pages printed Apr. 4, 2016.
Wikipedia, "Hirschberg test", https://web.archive.org/web/20151220061524/https://en.wikipedia.org/wiki/hirschberg_test archived Dec. 20, 2015 in 2 pages.

(56) References Cited

OTHER PUBLICATIONS

Christensen, Dana, "V-Beam Laser", https://web.archive.org/web/20160130091016/presstelegraph.com/2016/01/23/v-beam-laser.html archived Jan. 30, 2016 in 5 pages.

Telescope-optics.net, "Notes on Amateur Telescope Optics", http://www.telescope.optics.net/index.htm web-published on Jul. 14, 2006, updated Mar.-Jun. 2015 in 3 pages.

Telescope-optics.net., "Eye Spectral Response", http://www.telescope-optics.net/eye_spectral_response.htm accessed on Dec. 8, 2015 in 9 pages.

Levoy, Marc, "Optical recipes for light field microscopes", Stanford Computer Graphics Laboratory Technical Memo 2006-001, Computer Science Department, Stanford University, Jun. 20, 2006 (revised Jun. 28 and Aug. 9) in 5 pages.

Wikipedia, "Red reflex", https://en.wikipedia.org/wiki/Red_reflex accessed on Feb. 25, 2016 in 2 pages.

Wikipedia, "Ganzfeld effect", https://web.archive.org/web/20160305082958/https://en.wikipedia.org/wiki/Ganzfeld_effect as archived Mar. 5, 2016 in 2 pages.

Lumus, "The Lumus Solution", https://web.archive.org/web/20150212093731/http:/www.lumus-optical.com/index.php?option=com_content&task=view&id=5&Itemid=8 as archived Feb. 12, 2015 in 2 pages.

Wikipedia, "Myopia", https://web.archive.org/web/20150527122730/https://en.wikipedia.org/wiki/Near-sightedness as archived May 27, 2015 in 21 pages.

Wikipedia, "Astigmatism", https://web.archive.org/web/20160223084059/https://en.wikipedia.org/wiki/Astigmatism as archived Feb. 23, 2016 in 5 pages.

Hutton et al., "Undestanding Electric Viewing", RNIB, Sep. 5, 2014 in 4 pages.

Dunaief, MD, PhD, Joshua, "Low-Vision Therapy for Macular Degeneration: How It Can Help", BrightFocus Foundation, published Nov. 30, 2016 in 5 pages.

Wikipedia, "Phoropter", https://web.archive.org/web/20160122152227/https://en.wikipedia.org/wiki/Phoropter as archived Jan. 22, 2016 in 5 pages.

Wikipedia, "Retinoscopy", https://web.archive.org/web/20151019024742/https://en.wikipedia.org/wiki/Retinoscopy as archived Oct. 19, 2015 in 2 pages.

Wikipedia, "Ishihara test", https://web.archive.org/web/20160302073646/https://en.wikipedia.org/wiki/Ishihara_test as archived Mar. 2, 2016 in 4 pages.

Memim Encyclopedia, "Anomaloscope", https://memim.com/anomaloscope.html in 3 pages printed Feb. 11, 2019.

Vessel, Madeleine, "Wavefront Technology in Eye Exams", https://web.archive.org/web/20160314205244/https://www.allaboutvision.com/eye-exam/wavefront.htm as archived Mar. 14, 2016 in 5 pages.

Wikipedia, "Stereoscopy", https://web.archive.org/web/20160309170108/https://en.wikipedia.org/wiki/Stereoscopy as archived Mar. 9, 2016 in 8 pages.

Wikipedia, "Haploscope", https://web.archive.org/web/20151023085410/https://en.wikipedia.org/wiki/Haploscope as archived Oct. 23, 2015 in 2 pages.

Sunnex Technologies, "The Role of Blue Light in the Pathogenesis of AMD", https://web.archive.org/web/20151212232525/http://www.sunnexbiotech.com/therapist/blue%20light%20and%20amd.html as archived Dec. 12, 2015 in 13 pages.

Kodak, "In-Vivo Multispectral System FX", http://clab.ajums.ac.ir/_clab/documents/Multispectral_In-Vivo_Imaging.pdf, Carestream Health, Inc., 2008 in 8 pages.

U.S. Notice of Allowance for U.S. Appl. No. 17/020,641, dated Oct. 1, 2021.

* cited by examiner

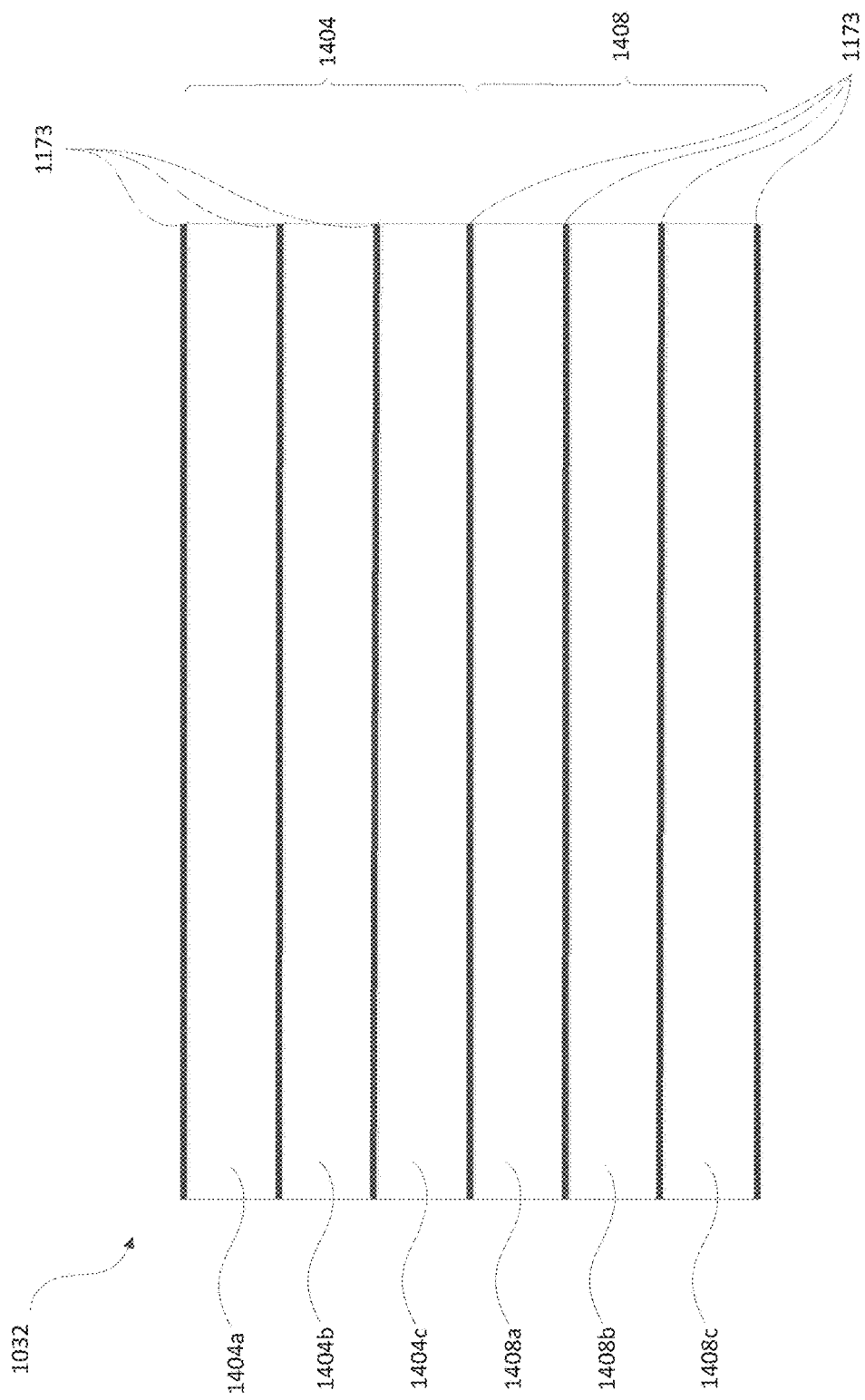

DISPLAY SYSTEM WITH VARIABLE POWER REFLECTOR

INCORPORATION BY REFERENCE

This application is a continuation of U.S. application Ser. No. 15/902,814 filed on Feb. 22, 2018 entitled "DISPLAY SYSTEM WITH VARIABLE POWER REFLECTOR," which claims the priority benefit of U.S. Provisional Patent Application No. 62/462,850 filed on Feb. 23, 2017 entitled "VARIABLE-FOCUS VIRTUAL IMAGE DEVICES," which is incorporated by reference herein in its entirety. This provisional patent application includes the following sections both of which are incorporated by reference and form a part of this patent application:
1. SECTION I: Specification and Drawings for the portion of the application entitled "DISPLAY SYSTEM WITH VARIABLE POWER REFLECTOR."
2. SECTION II: Specification and Drawings for the portion of the application entitled "VARIABLE-FOCUS VIRTUAL IMAGE DEVICES BASED ON POLARIZATION CONVERSION."

Sections I and II both discuss variable focus or variable power devices and features associated with the components of these devices and both Sections equally form part of the disclosure of this application. Accordingly, various features, elements, structures, methods, etc. described in Section I can be used with, combined with, incorporated into, or are otherwise compatible with features, elements, structures, methods, etc. described in Section II in any combination. Likewise, various features, elements, structures, methods, etc. described in Section II can be used with, combined with, incorporated into, or are otherwise compatible with features, elements, structures, methods, etc. described in Section I in any combination.

This application also incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to optical devices, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 20 featuring people, trees, buildings in the background, and a concrete platform 30. The user also perceives that he "sees" "virtual content" such as a robot statue 40 standing upon the real-world platform 1120, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

This application include discussions of systems and methods that can be employed to provide variable optical power. Variable focus or variable power devices may find application in certain head mounted display devices that project images as if the images originated from different depths. By changing the optical power of an optical element in the head mounted display device, images presented to the wearer of the head mounted display device appear as if located at different distances from the wearer. The variable focus or variable power optical device can thus be modulated to cause different image content to be displayed as if the image content is situated at different locations with respect to the user. Some variable power elements comprise reflectors comprising movable membranes. Other variable power elements comprise liquid crystal switchable devices that can switch between optical power levels using switchable liquid crystal elements. Some variable focus devices described herein utilize the polarization properties of light to facilitate switching from one focus to another.

The systems, methods and devices of this disclosure each have several innovative aspects, no single one of which is solely responsible for the desirable attributes disclosed herein. A variety of example systems and methods are provided below.

Embodiment 1: A wearable augmented reality head-mounted display system configured to pass light from the world forward a wearer wearing the head-mounted system into an eye of the wearer, said wearable augmented reality head mounted display system comprising:

an optical display configured to output light to form an image;

one or more waveguides disposed to receiving said light from said display;

a frame configured to dispose the waveguides forward of said eye such that said one or more waveguides have a forward side and a rearward side, said rearward side closer to said eye than said forward side;

a variable power reflector disposed on said forward side of said one or more waveguides, said variable optical power reflector configured to have an optical power that is adjustable upon application of an electrical signal; and one or more out-coupling elements disposed with respect to said one or more waveguides to extract light from the one or more waveguides and direct at least a portion of said light propagating within said waveguide to the variable power reflector, said light being directed from said variable power reflector back through said waveguide and into said eye to present an image from the display into the eye of the wearer.

Embodiment 2: The system of Embodiment 1, wherein said optical display comprise a scanning fiber display or a liquid crystal display.

Embodiment 3: The system of any of the Embodiments 1-2, wherein said variable power reflector comprises a deformable reflective surface having an adjustable shape.

Embodiment 4: The system of Embodiment 3, wherein said variable power reflector includes at least one electrode to apply an electric field to deform said reflective surface.

Embodiment 5: The system of any of the Embodiments 1-4, wherein said variable power reflector comprises silicon nitride.

Embodiment 6: The system of any of the Embodiments 1-5, wherein said variable power reflector comprises one or more switchable optical elements configured to switch between two states.

Embodiment 7: The system of Embodiment 6, wherein said two states comprise two levels of reflection.

Embodiment 8: The system of Embodiments 6 or 7, wherein said two states comprise two levels of optical power.

Embodiment 9: The system of any of Embodiments 6, 7 or 8, wherein said two states comprise two levels of transmission.

Embodiment 10: The system of any of Embodiments 6-9, wherein said one or more switchable optical elements comprises a diffractive optical element.

Embodiment 11: The system of any of Embodiments 6-10, wherein said one or more switchable optical elements comprises a reflective element.

Embodiment 12: The system of any of Embodiments 6-11, wherein said one or more switchable optical elements comprises liquid crystal element comprising liquid crystal.

Embodiment 13: The system of any of Embodiments 6-12, wherein said one or more switchable optical elements comprises a switchable polarization grating or a switchable polymer dispersed liquid crystal element.

Embodiment 14: The system of any of the Embodiments 1-13, wherein said variable power reflector comprises a stack of switchable optical elements, different of said switchable optical elements associated with different optical powers such that said stack of switchable optical elements can switch between different optical powers.

Embodiment 15: The system of any of the Embodiments 1-14, wherein said variable power reflector is configured to reflect light from said display while transmitting light from the world forward the wearer.

Embodiment 16: The system of any of the Embodiments 1-15, wherein said variable power reflector includes wavelength selective filters to reflect light from said display while transmitting light from the world forward the wearer.

Embodiment 17: The system of any of the Embodiments 1-16, wherein said variable power reflector has a transmission spectrum that includes a notch, light having a wavelength corresponding to said notch being reflected from said variable power reflector more than wavelengths adjacent to said notch.

Embodiment 18: The system of Embodiment 17, wherein the wavelength corresponding to said notch is reflected at least two times as much as light having wavelengths adjacent to said notch.

Embodiment 19: The system of Embodiment 17, wherein the wavelength corresponding to said notch is reflected at least five times as much as light having wavelengths adjacent to said notch.

Embodiment 20: The system of any of Embodiments 17-19, wherein said display comprises a color light source having a color corresponding with said notch wavelength.

Embodiment 21: The system of Embodiment 20, wherein the color of said color light source corresponds to red, green, or blue light.

Embodiment 22: The system of any of the Embodiments 1-21, wherein said variable power reflector includes one or more polarization selective filters to reflect light from said display while transmitting light from the world forward the wearer.

Embodiment 23: The system of any of the Embodiments 1-22, wherein said one or more out-coupling elements are configured to direct more light extracted from the one or more waveguides to the forward side of the one or more waveguides in comparison to the reverse side.

Embodiment 24: The system of any of the Embodiments 1-23, wherein said one or more out-coupling elements comprise one or more metasurfaces, one or more liquid crystal polarization gratings, one or more volume phase holograms or any combination thereof.

Embodiment 25: The system of any of the Embodiments 1-24, further comprising electronics in electrical communication with said variable power reflector to drive said variable power reflector, said electronics configured to change said optical power so as to present different image content as if originating from different depth planes.

Embodiment 26: The system of Embodiment 25, wherein said electronics is configured to change said optical power on a frame by frame basis.

Embodiment 27: The system of Embodiment 25, wherein said electronics is configured to change said optical power on a pixel by pixel basis.

Embodiment 28: The system of any of the Embodiments 1-27, further comprising a light recycling system configured to re-direct light extracted from the one or more waveguides toward the rearward side of the one or more waveguides toward the forward side such that said light can be incident on said variable power reflector and directed to said eye of the wearer.

Embodiment 29: The system of Embodiment 28, wherein said light recycling system comprises one or more polarization control elements or polarization selective elements.

Embodiment 30: The system of Embodiment 28, wherein said light recycling system comprises a polarization selective reflector disposed between said one or more waveguides and said eye.

Embodiment 31: The system of Embodiment 30, wherein said light recycling system comprises one or more retarders disposed between said one or more light guides and said polarization selective reflector.

Embodiment 32: The system of Embodiment 31, wherein said one or more retarders is disposed between said one or more light guides and said polarization reflector introduces a net retardance of about a half wave.

Embodiment 33: The system of any of Embodiments 29-32, wherein said recycling system comprises one or more retarders disposed between said one or more light guides and variable power reflector.

Embodiment 34: The system of Embodiment 33, wherein said one or more retarders disposed between said one or more light guides and variable power reflector introduces a net retardance of about a quarter wave.

Embodiment 35: A display device, comprising:
a waveguide configured to propagate visible light under total internal reflection in a direction parallel to a major surface of the waveguide and to outcouple the visible light in a direction normal to the major surface;

a deformable mirror configured to reflect visible light having a first polarization, wherein the deformable mirror comprises at least one of a notch reflector or one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

Embodiment 36: The display device of Embodiment 35, wherein the waveguide is configured to outcouple the visible light selectively towards the deformable mirror.

Embodiment 37: The display device of any of Embodiments 35 or 36, wherein different ones of the one or more CLC layers are configured to reflect visible light having a wavelength in a wavelength range corresponding to different ones of red, green or blue light, while being configured to transmit light having a wavelength outside the wavelength range.

Embodiment 38: The display device of any of Embodiments 35-37, wherein each of the chiral structures of the CLC layers comprises a plurality of liquid crystal molecules that extend in a layer depth direction by at least a helical pitch, wherein different ones of the one or more CLC layers have different helical pitches.

Embodiment 39: The display device of any of Embodiments 35-38, wherein different ones of the one or more CLC layers have substantially the same optical power.

Embodiment 40: The display device of any of Embodiments 35-39, wherein the display device comprises a plurality of notch reflectors, wherein each of the notch reflectors is configured to reflect visible light having a first polarization, wherein each of the notch reflector comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

Embodiment 41: The display device of Embodiment 40, wherein different ones of the plurality of notch reflectors have different optical powers.

Embodiment 42: The display device of Embodiment 40, further comprising a half-wave plate corresponding to each of the plurality of notch reflectors.

Embodiment 43: A display device, comprising:

a light projector configured to output light to form an image;

a waveguide assembly configured to receive light from the light projector, the waveguide assembly configured to propagate the received light via total internal reflection in a direction parallel to a major surface of the waveguide assembly and to outcouple the received light in a direction normal to the major surface, the waveguide assembly having a rearward side disposed closer to an eye of an user and a forward side disposed opposite the rearward side; and a deformable mirror configured to reflect a portion of the outcoupled light having a characteristic, the deformable mirror disposed on the forward side of the waveguide assembly.

Embodiment 44: The display device of Embodiment 43, wherein the characteristic of portion of the outcoupled light comprises a polarization characteristic.

Embodiment 45: The display device of Embodiments 43 or 44, wherein the characteristic of portion of the outcoupled light comprises a wavelength characteristic.

Embodiment 46: The display device of any of Embodiments 43-45, wherein the deformable mirror comprises a polarizing reflector configured to reflect a portion of the outcoupled light having a polarization characteristic.

Embodiment 47: The display device of any of Embodiments 43-46, wherein the deformable mirror comprises a notch reflector configured to reflect light within a wavelength range.

Embodiment 48: The display device of any of Embodiments 43-47, further comprising a polarizer disposed on the rearward side of the waveguide assembly.

Embodiment 49: The display device of any of Embodiments 43-48, wherein the deformable mirror comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

Embodiment 50: The display device of any of Embodiments 43-49, wherein the waveguide assembly comprises one or more liquid crystal layers.

Embodiment 51: The system of any of Embodiments 6-11, wherein said one or more switchable optical elements comprise a cholesteric liquid crystal (CLC).

Embodiment 52: The system of any of the Embodiments 1-23, wherein said one or more out-coupling elements comprise a cholesteric liquid crystal (CLC).

Embodiment 53: A display device, comprising:

a waveguide configured to propagate visible light under total internal reflection in a direction parallel to a major surface of the waveguide and to outcouple the visible light in a direction normal to the major surface;

a notch reflector configured to reflect visible light having a first polarization, wherein the notch reflector comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

Embodiment 54: The display device of Embodiment 53, wherein the waveguide is configured to outcouple the visible light selectively towards the notch reflector.

Embodiment 55: The display device of any of Embodiments 53 or 54, wherein the notch reflector comprises a deformable mirror having the one or more CLC layers formed thereon.

Embodiment 56: The display device of any of Embodiments 53-55, wherein different ones of the one or more CLC layers are configured to reflect visible light having a wavelength in a wavelength range corresponding to different ones of red, green or blue light, while being configured to transmit light having a wavelength outside the wavelength range.

Embodiment 57: The display device of any of Embodiments 53-56, wherein each of the chiral structures of the CLC layers comprises a plurality of liquid crystal molecules that extend in a layer depth direction by at least a helical pitch, wherein different ones of the one or more CLC layers have different helical pitches.

Embodiment 58: The display device of any of Embodiments 53-58, wherein different ones of the one or more CLC layers have substantially the same optical power.

Embodiment 59: The display device of Embodiment 53, wherein the display device comprises a plurality of notch reflectors, wherein each of the notch reflectors is configured to reflect visible light having a first polarization, wherein each of the notch reflector comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light.

Embodiment 60: The display device of Embodiment 59, wherein different ones of the plurality of notch reflectors have different optical powers.

Embodiment 61: The display device of Embodiments 59 or 60, further comprising a half-wave plate corresponding to each of the plurality of notch reflectors.

BRIEF DESCRIPTION OF THE DRAWINGS

FIG. 14 illustrates an embodiment of a stack or plurality of switchable reflective elements having a plurality of switchable reflective elements.

DETAILED DESCRIPTION

Figure 1:
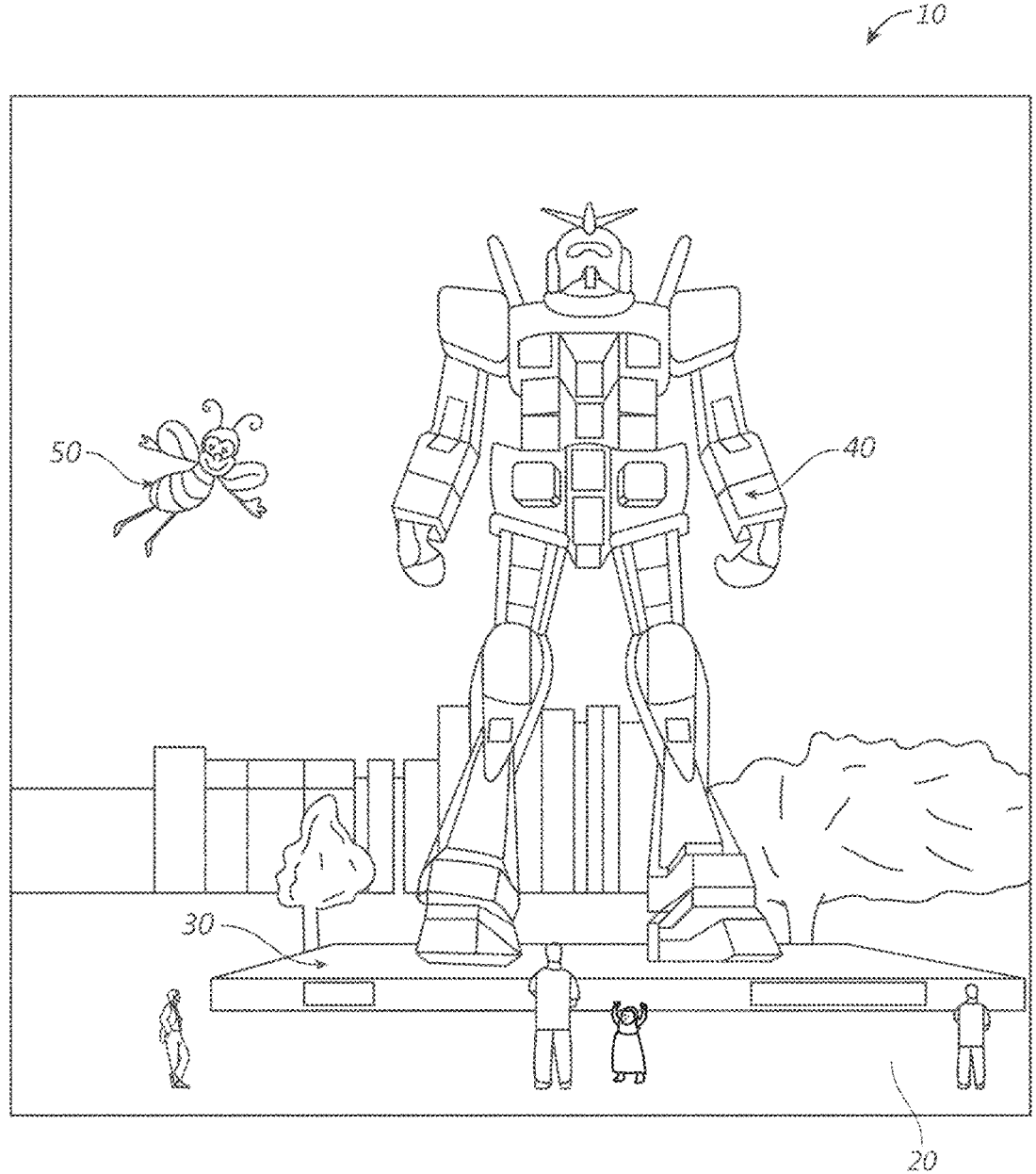
FIG. 1 illustrates a user's view of augmented reality (AR) through an AR device.

A wearable augmented reality head-mounted display system can be configured to pass light from the world forward a wearer wearing the head-mounted system into an eye of the wearer. The head-mounted display system can include an optical display that is configured to output light to form an image. The display system may include a frame that includes waveguides that are forward of the eye such that said one or more waveguides have a forward side and a rearward side and such that the rearward side is closer to the eye than the forward side. The system may include one or more waveguides that are disposed to receiving the light from the display. A variable power reflector can be disposed on the forward side of the one or more waveguides. The reflector can be configured to have an optical power that is adjustable upon application of an electrical signal. The system may further include one or more out-coupling elements that are disposed with respect to the one or more waveguides to extract light from the one or more waveguides. The elements may direct at least a portion of the light propagating within the waveguide to the variable power reflector. The light being directed from the variable power reflector may be reflected back through the waveguide and into the eye to present an image from the display into the eye of the wearer.

The optical display may include a scanning fiber display or a liquid crystal display. In some variants, the variable power reflector includes a deformable reflective surface that has an adjustable shape. The variable power reflector may include at least one electrode to apply an electric field to deform the reflective surface. The variable power reflector may include silicon nitride. The variable power reflector may include one or more switchable optical elements that are configured to switch between two states. The two states may include two levels of reflection, two levels of optical power, and/or two levels of transmission.

The one or more switchable optical elements may include a diffractive optical element, a reflective element, and/or a liquid crystal element that includes liquid crystal.

The head-mounted display system may include one or more switchable polarization gratings or switchable polymer dispersed liquid crystal elements. The variable power reflector may include a stack of switchable optical elements associated with different optical powers such that the switchable optical element can switch between different optical powers.

In some cases, the variable power reflector is configured to reflect light from the display while transmitting light from the world forward the wearer. The variable power reflector may include wavelength selective filters to reflect light from the display while transmitting light from the world forward the wearer. The variable power reflector may have a transmission spectrum that includes a notch in such a way that light that has a wavelength corresponding to the notch is reflected from the variable power reflector more than wavelengths that are adjacent to the notch. The wavelength corresponding to the notch may be reflected at least five times as much as light having wavelengths adjacent to the notch.

The head-mounted display may include a color light source that produces a color corresponding with the notch wavelength. For example, the color of the color light source may correspond to red, green, or blue light.

The variable power reflector may include polarization selective filters to reflect light from the display while transmitting light from the world forward the wearer.

In some designs, the one or more out-coupling elements are configured to direct more light that is extracted from the one or more waveguides to the forward side of the one or more waveguides in comparison to the reverse side. The one or more out-coupling elements may include one or more metasurfaces, one or more liquid crystal polarization gratings, one or more volume phase holograms or any combination thereof.

The display system may include electronics that are in electrical communication with the variable power reflector to drive the variable power reflector. The electronics can be configured to change the optical power so as to present different image content as if originating from different depth planes. The electronics may be configured to change the optical power on a frame by frame basis or a pixel by pixel basis.

The system may include a recycling system. The recycling system may be configured to re-direct light that is extracted from the one or more waveguides toward the rearward side of the one or more waveguides toward the forward side such that the light can be incident on the variable power reflector and directed to the eye of the wearer. The recycling system may include one or more polarization control elements or polarization selective elements. The recycling system may include a polarization selective reflector that is disposed between the one or more waveguides and the eye.

The recycling system can include one or more retarders that are disposed between the one or more light guides and the polarization reflector. The one or more retarders that are disposed between the one or more light guides and the polarization reflector can be configured to introduce a net retardance of about a half wave.

In some designs, the recycling system may include one or more retarders that are disposed between the one or more light guides and the variable power reflector. The one or more retarders that are disposed between the one or more light guides and the variable power reflector can be configured to introduce a net retardance of about a quarter wave.

Reference will now be made to the figures, in which like reference numerals refer to like parts throughout.

Figure 2:
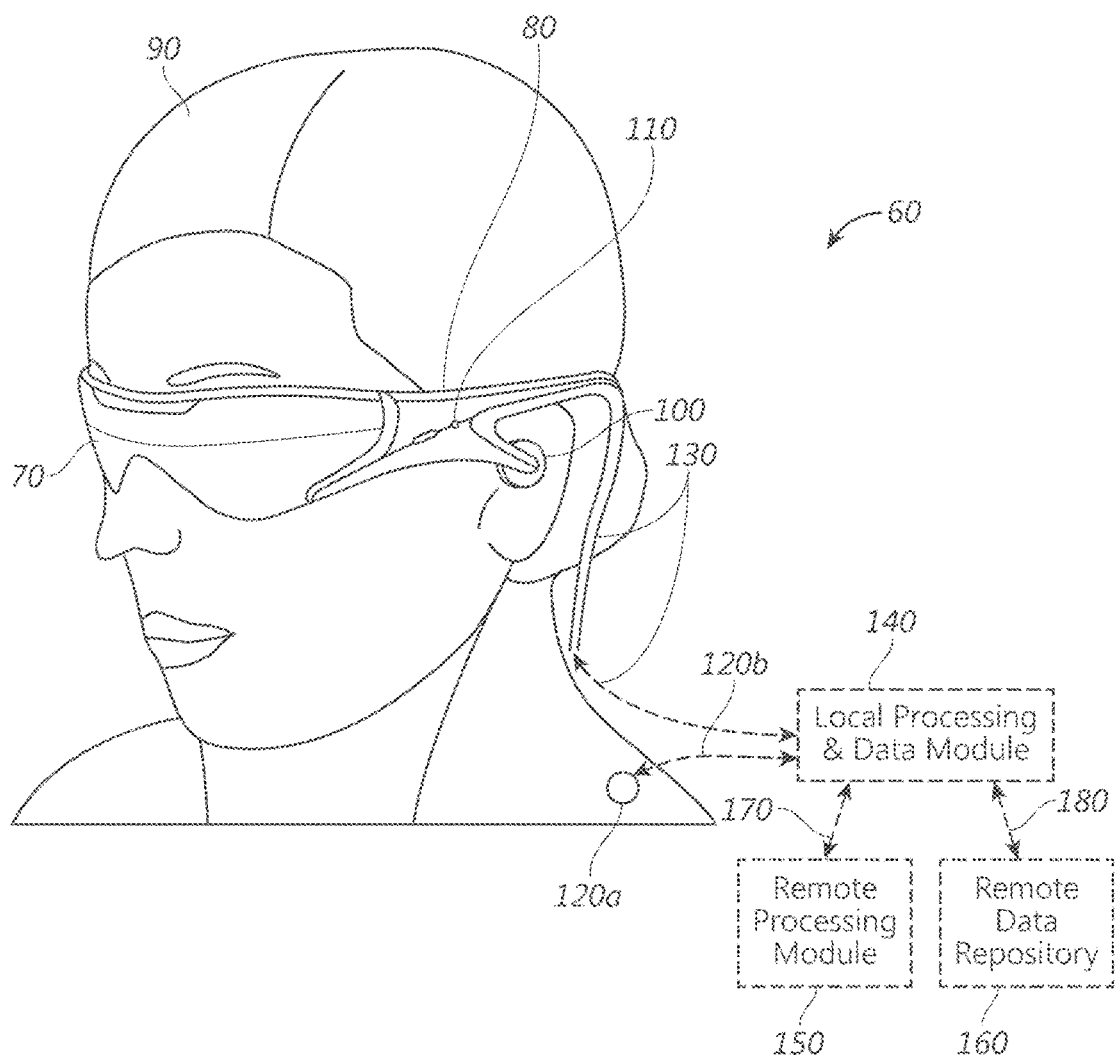
FIG. 2 illustrates an example of wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems). The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
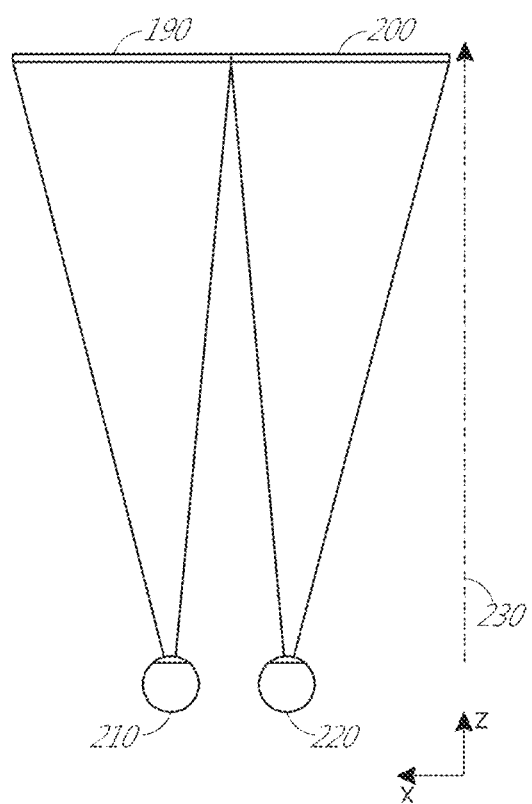
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
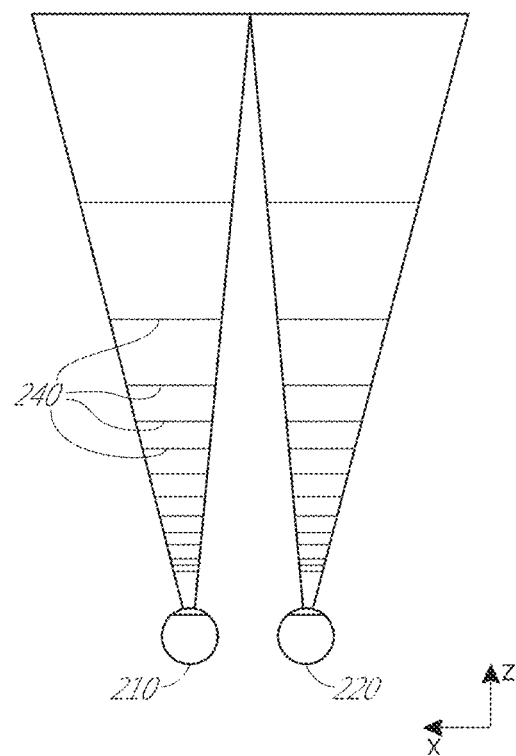
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
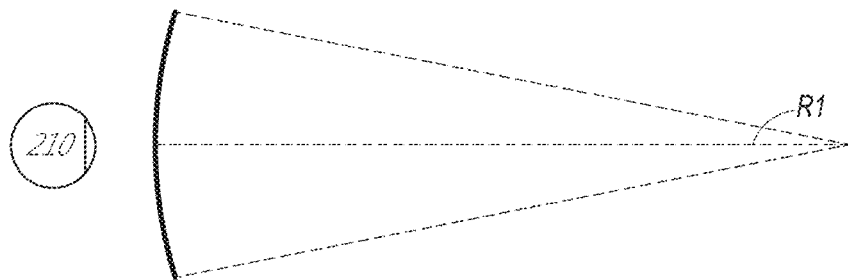
FIGS. 5A-5C illustrate relationships between radius of curvature and focal radius.
Figure 5B:
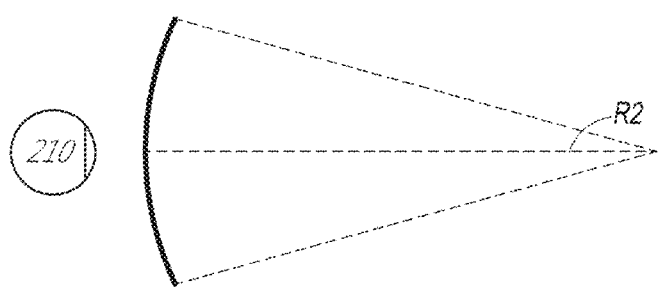
Figure 5C:
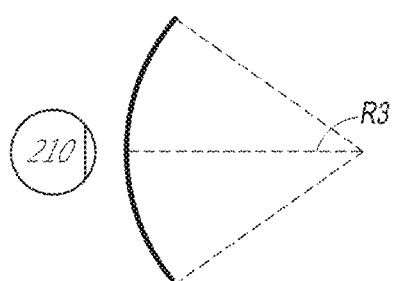

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
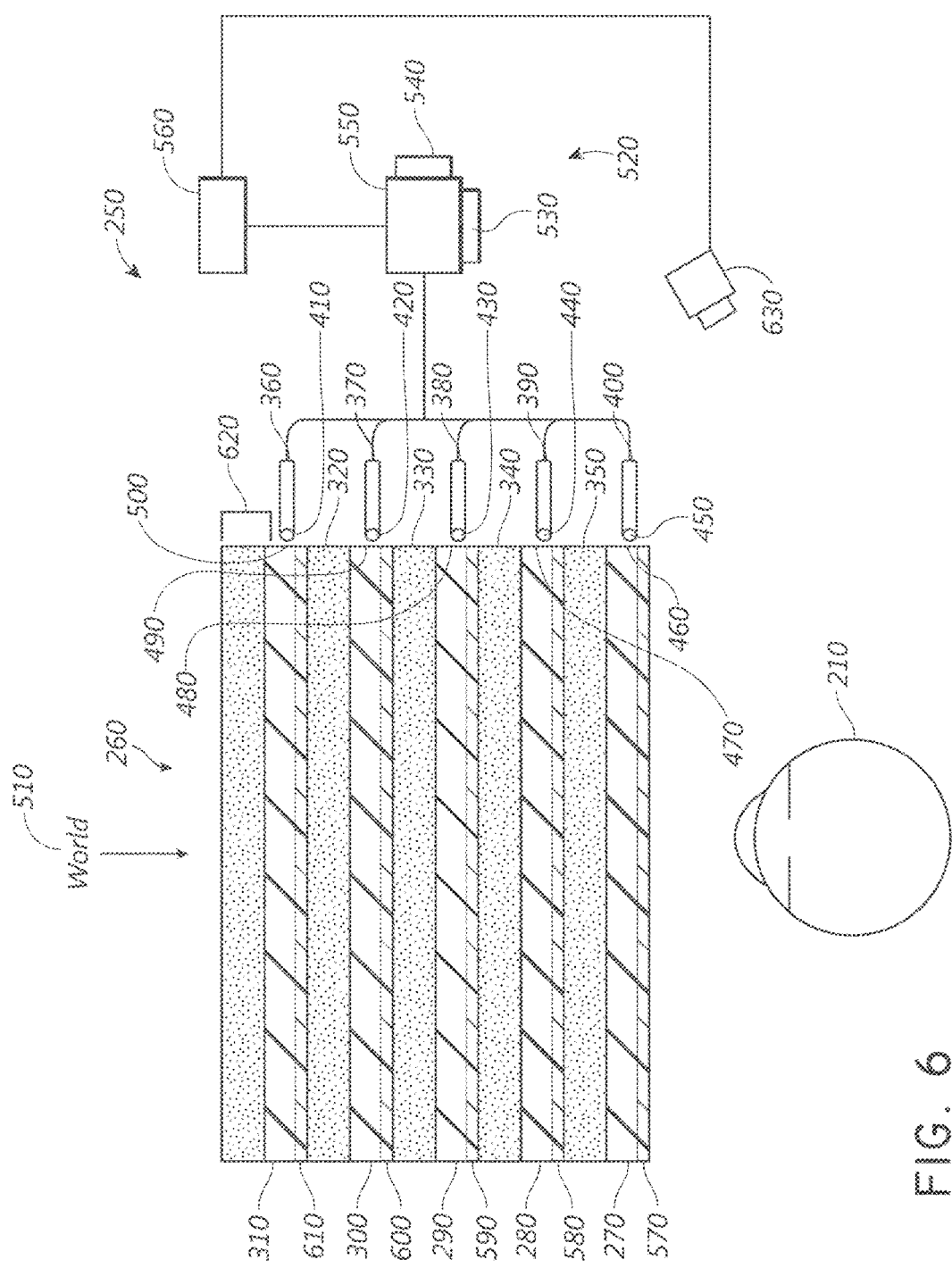
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
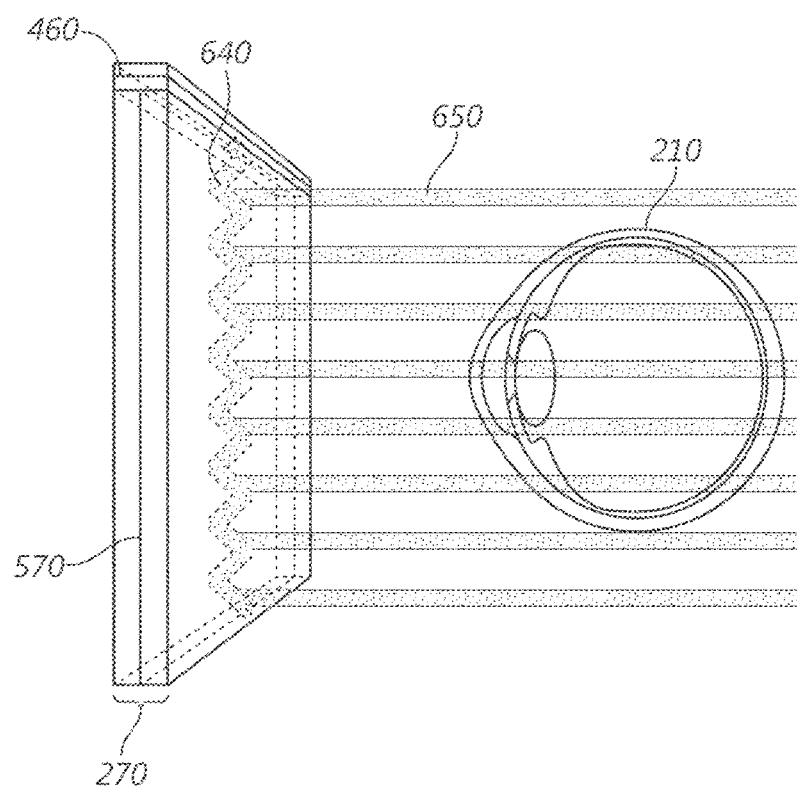
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide

270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
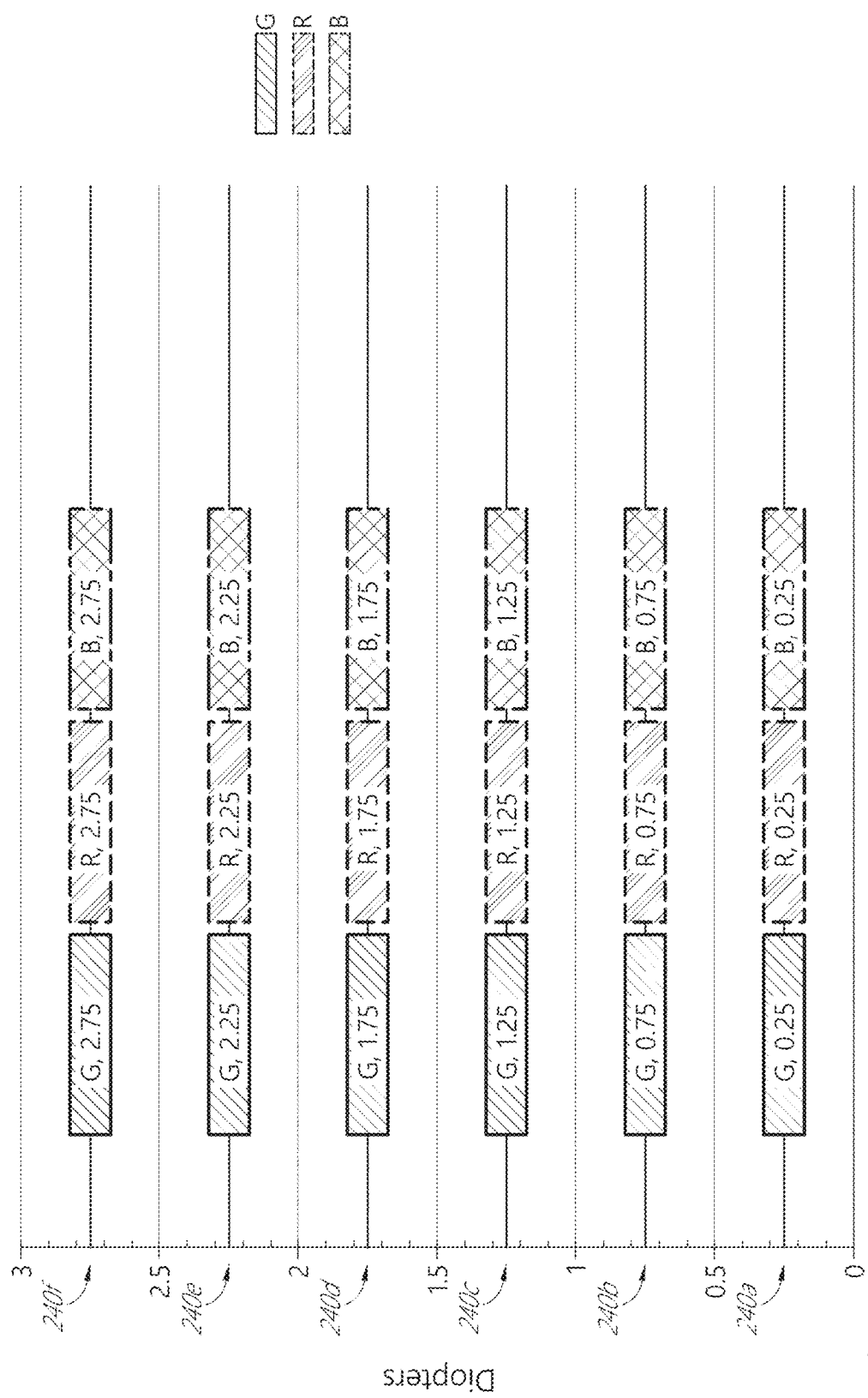
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
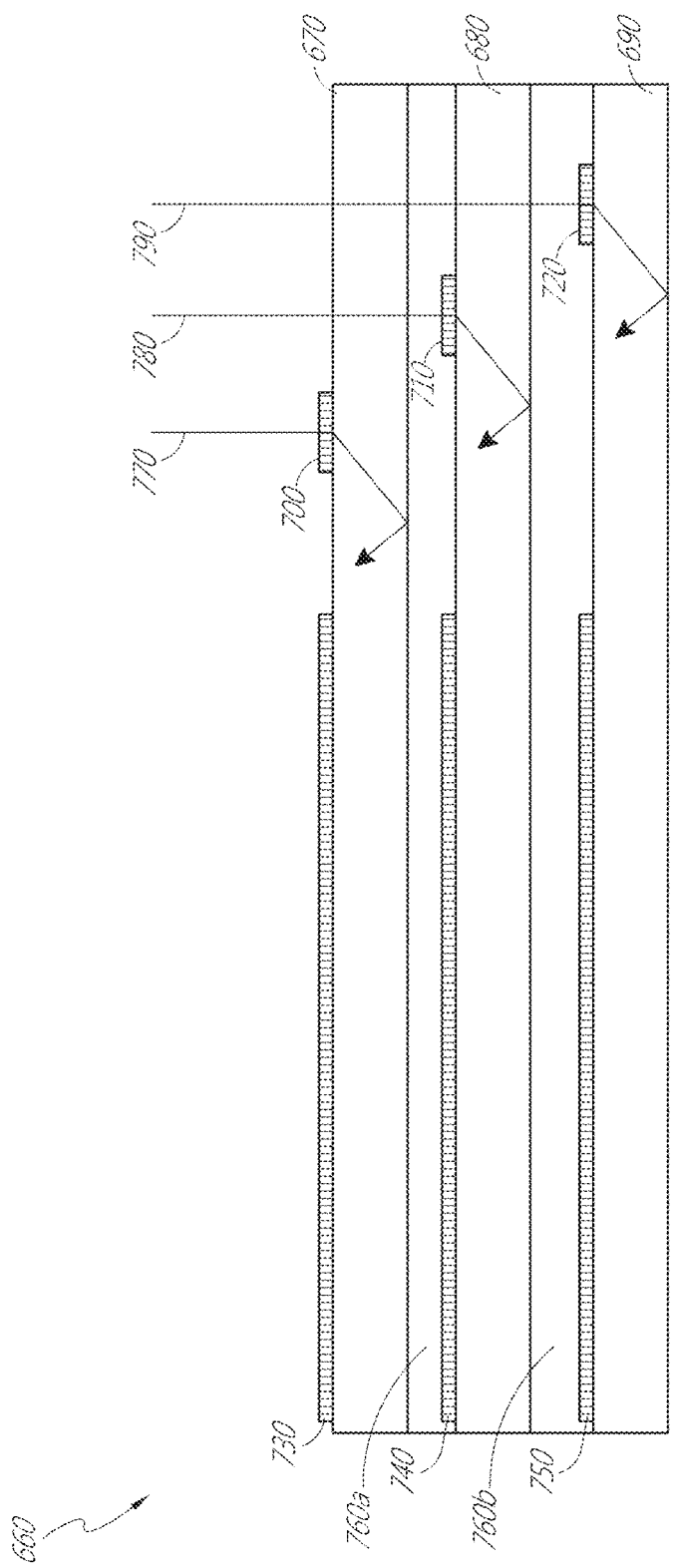
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 1242 and 1244, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
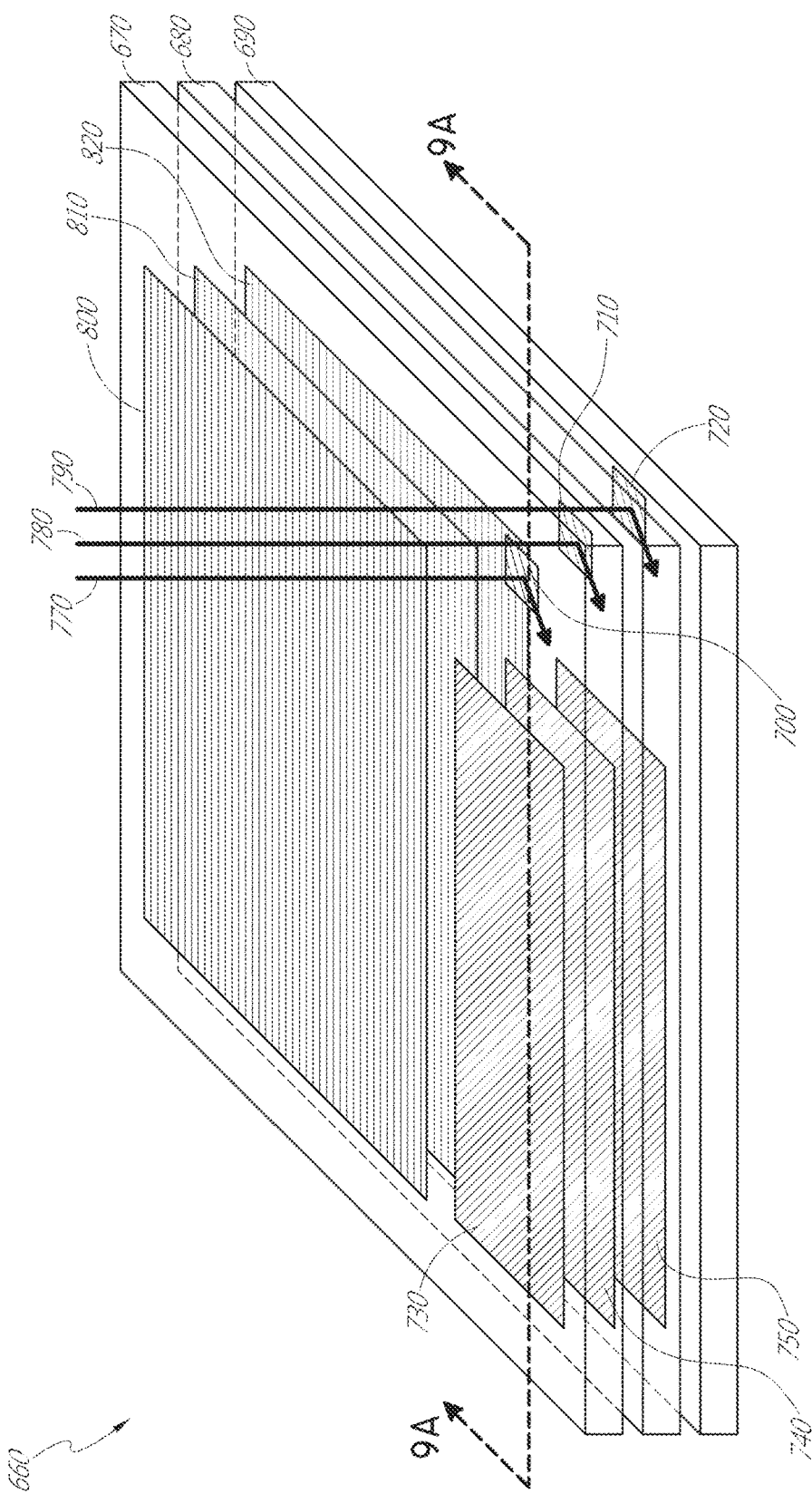
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
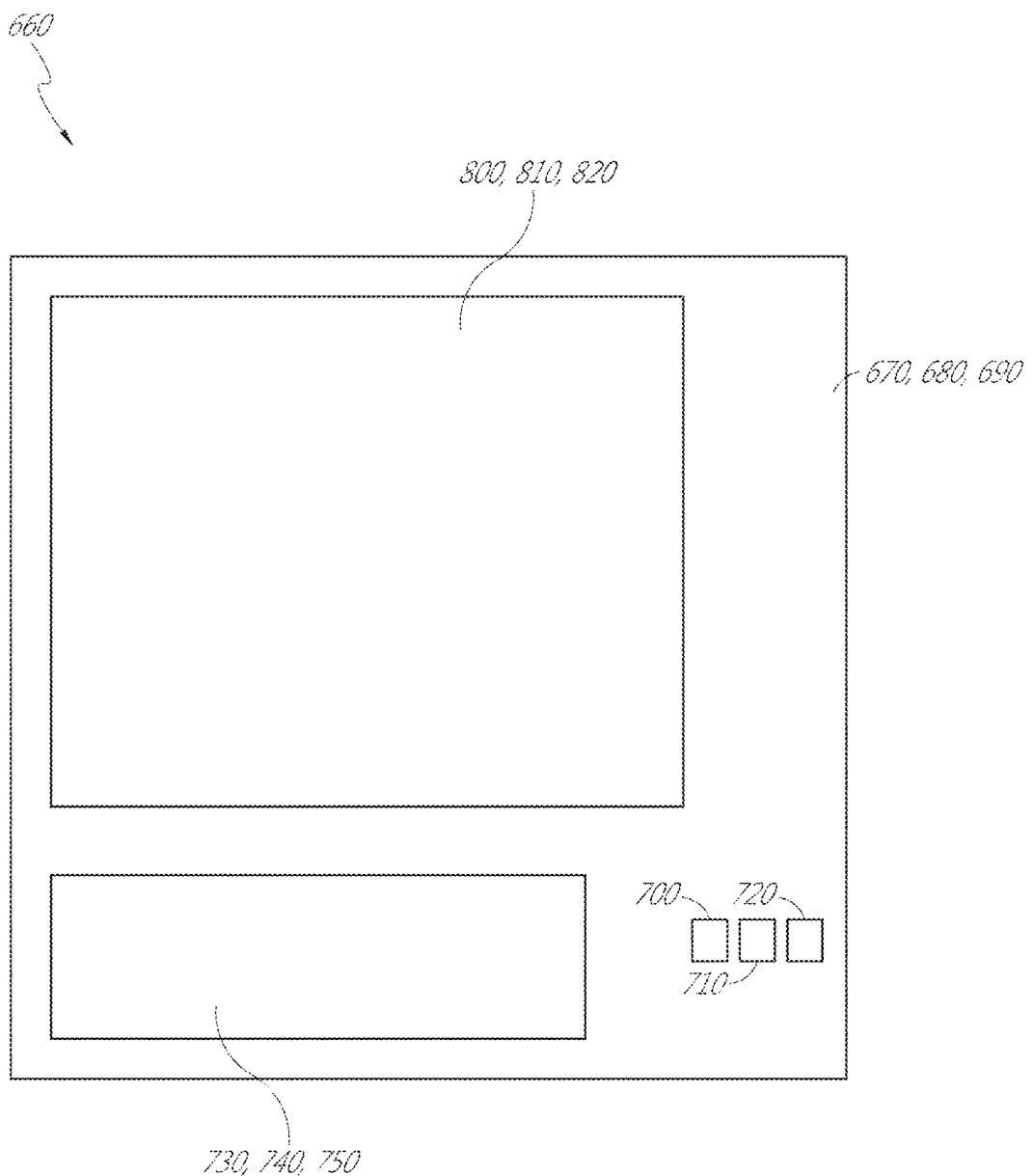
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Variable Power Reflector

Figure 10A:
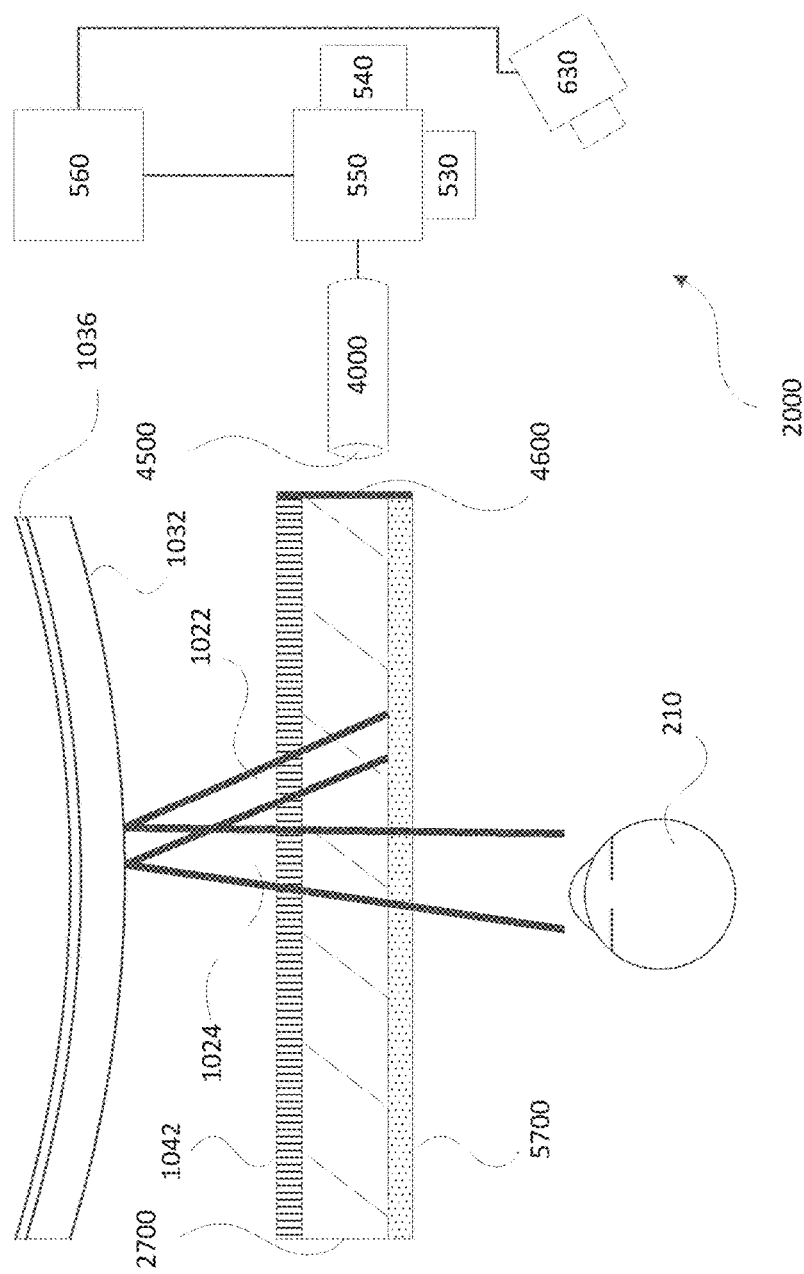
FIG. 10A illustrates a wearable augmented reality head-mounted display system that includes a variable power reflector disposed to receive light from the light projector system.

As illustrated in FIG. 10A, the wearable augmented reality head-mounted display system 60 may include a variable power reflector (or variable focus reflector) 1032 disposed to receive light from the light projector system 2000, e.g., via the waveguide 2700. The variable power reflector 1032 may be configured to have an optical power that is adjustable upon application of an electrical signal. For example, the variable power reflector 1032 shown in FIG. 10A comprises a deformable reflector having a deformable reflective surface (e.g., surface closest to waveguide 2700) having a shape that is adjustable. For example, the shape of the deformable reflector 1032 may be configured to bend to produce different convex shapes corresponding to different optical power. The variable power reflector 1032, may for example, comprise a deformable membrane or other thin member that is flexible and can vary its shape. In some designs, the deformable reflector 1032 is electrically actuated. The deformable reflector may, for example, include at least one electrode 1036 to apply an electric field to deform the reflective surface possibly via electro-static forces or by some other. As illustrated in FIG. 10A, another electrode 1042 is included on the surface of the waveguide 2700. Application of a voltage across the two electrodes 1036 and 1042 may provide such an electric field and may thus cause the deformable reflector to deform. With deformation of the deformable membrane or member, the reflective surface (e.g., surface closest to the waveguide 2700) may be deformed. As illustrated, the shape can be convex and thus provide a reflective surface having negative optical power. Although in some examples the surface closest to the waveguide 2700 may comprise a reflective surface for reflecting light from the light projection system (display) 2000, other surfaces associated with the variable power reflector may reflect light from the light project system. The variable power reflector 1032 may, for example, include multiple layers that include one or more reflective surface that need not be the surface closest to the light guide 2700. The variable power reflector 1032 may be wavelength selective and/or polarization selective such that light having certain wavelengths and/or polarization states are reflected by the variable power reflector 1032 while light having other wavelengths and/or polarization states are transmitted through the variable power reflector 1032.

The waveguide 2700 may have a forward side and a rearward side with the rearward side being closest (more proximal) to the eye of the wearer and the forward side being farther (or more distal) to the eye of the wearer and closer to the world in front of the wearer and the head mounted display system. As illustrated the variable power reflector 1032 may be disposed on a forward side of the waveguide. The waveguide may include outcoupling elements configured to extract light from the waveguide and direct this light toward the forward side of the waveguide so as to be incident on the variable power reflector. Since the variable power reflector is disposed on the forward side of the waveguide, the variable power reflector is configured to transmit light from the world forward the wearer such that the head-mounted display system can pass light from the world forward a wearer wearing the head-mounted system into an eye of the wearer. Despite being transmissive to light from the world forward the wearer, the variable power reflector 1032 is configured to reflect light from said display. As discussed below, in some examples, the variable power reflector may include one or more wavelength selective filters to reflect light from the light projection system (display) 2000 while transmitting light from the world forward the wearer. Additionally, in some examples, the variable power reflector may include one or more polarization selective filters to reflect light from the light projection system (display) 2000 while transmitting light from the world forward the wearer.

As illustrated, the variable power reflector may be caused to deform its shape to cause light from the display 2000 that is reflected from the variable power reflector to diverge. In particular, light from the light source 530 is being directed by the beam splitter 550 to the spatial light modulator 540 and to an image injection device 4000 disposed with respect to the waveguide 2700 to couple spatially modulated light containing an image into the waveguide. This light 1022 may propagate through the waveguide 2700 by total internal reflection (TIR) and be extracted therefrom via one or more outcoupling optical elements (e.g., an exit pupil expander comprising, for example, diffractive features). In some configurations, the light from the display 2000 that is injected into the waveguide 2700 may be collimated and thus collimated light 1022 may exit the waveguide and propagate toward the variable power reflector 1032 as illustrated in FIG. 10A. In the example shown in FIG. 10A, the variable power reflector (or variable focus reflector) is deformed so as to create a convex reflective surface that produces a negative optical power (e.g., produces a virtual image at a distance from the eye 210), thus causing reflected light rays 1024 to diverge. The reflected light 1024 may then enter the eye 210 of an individual (e.g., a wearer) and appear to be formed by an object a short distance from the eye on the other side of the waveguide and deformable mirror. As a result, the image formed by the display may appear to originate from an object relatively close to the wearer.

In the example shown in FIG. 10A, light exits the image injection device 4000 and is injected into an input surface 4600 of the waveguide 2700 that is on the edge of waveguide 2700. In other examples, however, the light may be injected into a major surface of the corresponding waveguide (e.g., one of the waveguide surfaces directly facing the world 144 or the viewer's eye 210). See, for example, FIGS. 9A-9C. In various embodiments, light from the image injection device 4000 can be polarized prior to being injected into the waveguide 2700. For example, the light injected into the waveguide 2700 can be configured to be linearly polarized along the vertical (or horizontal) direction.

In certain configurations, the one or more outcoupling optical elements 5700 may be configured to direct substantially all outcoupled light in a distal direction from the eye of the viewer, e.g. towards the world. The one or more outcoupling optical elements 5700 may include one or more asymmetrical diffraction gratings.

Although the variable power reflector 1032 may be disposed so as to reflect light outcoupled in a distal direction from the eye 210 of the user back towards the eye 210 of the user potentially altering the wavefront of the light reflected therefrom, the variable power reflector transmits light from the world in front of the wearer to the user's eye without introducing similar changes to the wavefront. For example, although the variable power reflector may be configured have optical power that acts on light from the display 2000 that is reflected from the variable power reflector, the variable power reflector may not similarly act on the light from the world in front of the wearer that is transmitted therethrough to the eye. In some cases, for example, the thickness of the variable power reflector 1032 may be chosen sufficiently low so as not to significantly alter the optical properties of light passing through the variable power reflector 1032 (e.g., from the world). Advantageously, this may allow for light passing through the variable power reflector 1032 from the world to be observed at the proper depths while controlling the depths at which images from the display 2000 appear to be originating. This configuration may therefore exclude any additional lenses to compensate for a change in the radius of curvature or optical power of the variable power reflector for light from the world in front of the wearer, and accordingly make the system lighter, cheaper and less complex.

The reflector 1036 may be comprised of one or more transparent materials, such as, for example, silicon mononitride (SiN). The material at the appropriate thickness may also be sufficiently flexible to be deformed, for example, by electrostatic forces with application of an electric field. Other methods of deforming the variable power reflector may be used. Similarly, as discussed below, other ways of providing for variable optical power different from deforming the shape of the reflector may also be employed.

In some embodiments, the resiliency of the variable power reflector 1032 allows for rapid temporal transitions among one or more optical powers. For example, rapid transitions from one focal length (e.g., curvature) to another may allow for a time-multiplexing of different focal planes as seen by a viewer (e.g., the eye 210). In some embodiments, transitions may toggle between two or more focal lengths many times a minute.

As discussed above, in some cases, the curvature of the variable power reflector 1032 is controlled by two or more electrodes. Although a distal electrode 1036 may be disposed on a distal side of the variable power reflector 1032, as illustrated by FIG. 10A, and a proximal electrode 1042 may be disposed proximal to the reflector 1032 (e.g., disposed on the waveguide 2700, as shown In FIG. 10A), other electrode configuration are possible. The distal electrode 1036 may be disposed on a proximal side of the variable power reflector 1032. The electrodes 1036, 1042 may be comprised of a material that can conduct electricity and that is transparent to visible light. One or more materials may be used for the electrodes 1036, 1042, such as, for example, indium tin oxide (ITO).

The electrodes may be in electrical communication with electronics configured to drive the variable power reflector. These electronics may be configured to change the optical power of the variable optical power reflector so as to present different image content as if originating from different depth planes. In certain configurations, for example, the controller 560 or other electronics controls the operation the variable power reflector and may control, in conjunction, one or more of the waveguide 2700 (e.g., stacked waveguide assembly of FIG. 6) and/or other parts of the light projector system 2000 (e.g., the image injection device 4000, the light source 530, the light modulator 540, the camera assembly 630). In some cases, the controller 560 regulates the timing and provision of image information to the waveguide 2700 and thus to the variable power reflector and also controls the timing of the actuation or variation in optical power of the variable power reflector and synchronization therebetween.

Figure 10B:
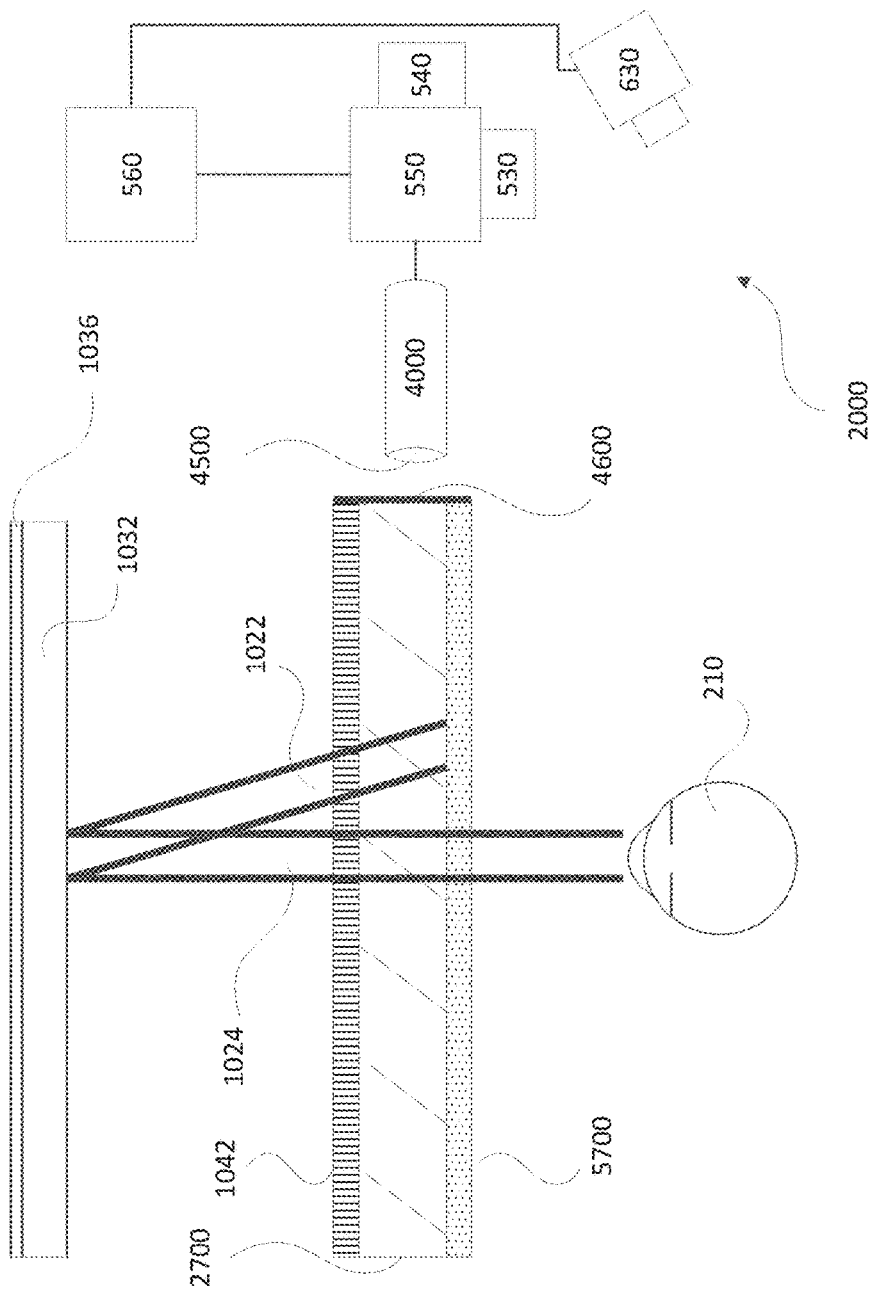
FIG. 10B illustrates the light projection system of FIG. 10A where the variable power reflector creates virtual images as if emanating from an object at infinity.

Accordingly, the variable power reflector (or the variable focus reflector) 1032 may have optical power that is adjustable and that can be controlled electronically. This capability allows the depth plane corresponding to image outcoupled from the waveguide 2700 to be dynamically adjusted. For example, the light outcoupled from the waveguide 2700 may be substantially collimated, as if the object generating the light is located at an infinite distance (or at least far) from the viewer. If the desired focal plane corresponding to the variable power reflector (or the variable focus reflector) in at an infinite distance, the reflector 1032 can be set in a planar state so as, in this case where collimated light is output from the waveguide, to leave the wavefront curvature of the reflected light substantially unchanged. This situation is shown in FIG. 10B. Alternatively, if the desired focal plane is closer to the viewer than infinity, the variable power reflector 1032 may be adjusted (e.g., flexed, electrically influenced) to assume an appropriate amount of convex curvature. This mode is shown in FIG. 10A.

Accordingly, FIG. 10B illustrates the light projection system 2000 of FIG. 10A where the variable power reflector 1032 creates virtual images as if at infinity. The light rays 1022 exit the waveguide 2700 parallel or substantially parallel to each other and propagate toward the variable power reflector 1032. Because the electrodes 1036, 1042 have caused the reflector 1032 to have a flat reflective surface, the reflected light rays 1024 are also parallel to each other as they propagate toward the eye 210. In some embodiments, like in FIG. 10A, the variable power reflector 1032, the waveguide 2700, and the outcoupling optical element 5700 are configured not to substantially alter the degree of divergence of the light 1024.

As discussed above, the variable power reflector may be configured to reflect light from the display 2000 while transmitting light from the world forward the wearer. For example, the variable power reflector may include wavelength selective filters to reflect light from the display while transmitting light from the world forward the wearer. In some designs, for example, the variable power reflector 1032 comprises one or more wavelength selective filters (e.g., notch filters, band-pass filters) corresponding to one or more colors or combinations of colors. For example, one or more notch filters may be tuned to reflect light at a range of wavelengths corresponding to the color green (e.g., a narrow band within the range between 520-560 nm), the color red (e.g., a narrow band within the range between 635 nm-700 nm), and/or the color blue (e.g., a narrow band within the range between 450 nm-490 nm), while allowing light to be transmitted through the reflector 1032 at other visible wavelengths. Because it may be advantageous to allow most visible wavelengths of light passed through the reflector (e.g., from the "world"), the one or more wavelength selective filters can be tuned to reflect only a narrow range of visible wavelengths. For example, the reflector may comprise one or more notch filters each configured to reflect a band of wavelengths encompassing a range of between about 0.1 nm and 2 nm, between about 1 and 5 nm, between about 2 nm and 8 nm, between about 5 nm and 10 nm, and/or between about 10 and 25 nm. Any range formed by any of these values is possible. Other size bands are also possible.

The narrow bands in the visible spectrum where the variable power reflector is reflective may coincide with the color of light emitted by the display 2000. The display, for example, may comprise one or more light sources (e.g., LEDs or lasers) that emit light of a particular color. The narrow band reflected by the variable power reflector may overlap and/or coincide with the color and wavelengths emitted by these light sources in the display.

Although the spectral transmission of the variable power reflector 1032 reflects light having a wavelength within these narrow bands, light outside these bands may be transmitted. Accordingly, much of the ambient visible light from the world forward the wearer and the head-mounted display is transmitted through the variable power reflector. To provide such reflectivity characteristics, the variable power reflector may include one or more reflective layers. For example the variable power reflector may include a plurality of layers having different spectral reflectivity.

Figure 10C:
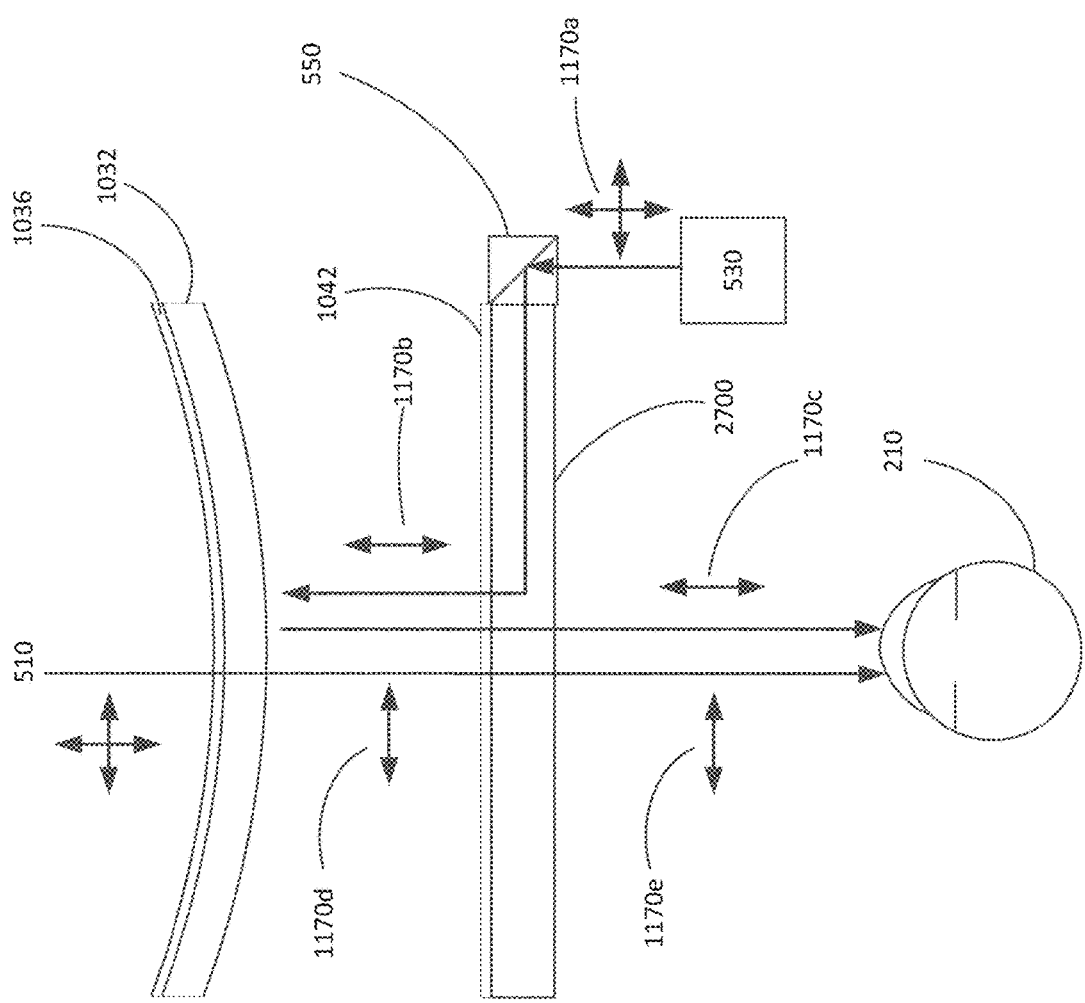
FIG. 10C illustrates a variable power reflector that is polarization selective and that uses the polarization of light to determine what light is reflected and what light is transmitted.

Similarly, the variable power reflector may include one or more polarization selective filters to reflect light from the display while transmitting light from the world forward the wearer. FIG. 10C, for example, illustrates a variable power reflector 1032 that is polarization selective and that uses the polarization of light to determine what light is reflected and what light is transmitted. In this example, the variable power reflector is configured to reflect one polarization state and transmits another polarization state. In particular, the variable power reflector is configured to reflect one linear polarization state (vertical) and transmits another linear polarization state (horizontal). As shown in FIG. 10C, the light source 530 in the display emits light 1170a with both horizontal and vertical polarization. The light 1170b output from the waveguide by the output coupling elements, however, is shown as vertically polarized. The variable power reflector 1032, in this example, is be configured to reflect vertically polarized light. As shown, the vertically polarized light 1170b is reflected by the reflector 1032. The light 1170c from the display 2000 entering the eye 210 may thus be vertically polarized. As discussed above, the variable power reflector may be wavelength selective in addition to being polarization selective.

In contrast, in the example shown in FIG. 10C, light from the world 510 may comprise both vertically and horizontally polarized light. If the variable power reflector 1032 is configured to transmit horizontally polarized light and/or reflect (and/or absorb) vertically polarized light, horizontally polarized light 1170d may successfully pass (e.g., transmit) through the reflector 1032 without corresponding vertically polarized light. As such, the light 1170e from the world in front of the wearer entering the eye 210 may be horizontally polarized.

In this manner, the variable power reflector may both reflect light from the display 2000 as well as pass visible light from the world in front of the wearer and the head-mounted display. Other techniques, however, may be employed.

For example, in some embodiments, the waveguide 2700 can comprise a liquid crystal grating. The liquid crystal grating can comprise a cholesteric liquid crystal (CLC) layer having a plurality of liquid crystal molecules that are arranged to have successive azimuthal twists of the director as a function of position in the film in a layer normal direction, or a layer depth direction, of the liquid crystal layer. As described herein, the liquid crystal molecules that are arranged to have the successive azimuthal twists are collectively referred to as a chiral structure. As described herein, an angle (ϕ) of azimuthal twist or rotation is described as the angle between the directors the liquid crystal molecules, relative to a direction parallel to the layer normal. The spatially varying director of the liquid crystal molecules of a chiral structure can be described as forming a helical pattern in which the helical pitch (p) is defined as the distance (e.g., in the layer normal direction of the liquid crystal layer) over which the director has rotated by 360°, as described above. The liquid crystal grating can be configured as a diffraction grating as discussed below.

Without being bound to any theory, under a Bragg-reflection condition, the wavelength of the incident light (λ) may be proportional to the mean or average refractive index (n) of a CLC layer and to the helical pitch (p), and can be expressed as satisfying the following condition under some circumstances:

$$\lambda \approx np \qquad [1]$$

Thus, by controlling the pitch p of the liquid crystal molecules, different ones of the switchable reflective elements can be tuned to reflect different wavelengths. In addition, the bandwidth (Δλ) of Bragg-reflecting wavelengths may be proportional to the birefringence Δn (e.g., the difference in refractive index between different polarizations of light) of CLC layer and to the helical pitch (p), and can be expressed as satisfying the following condition under some circumstances:

$$\Delta\lambda = \Delta n \cdot p \qquad [2]$$

Figure 10D:
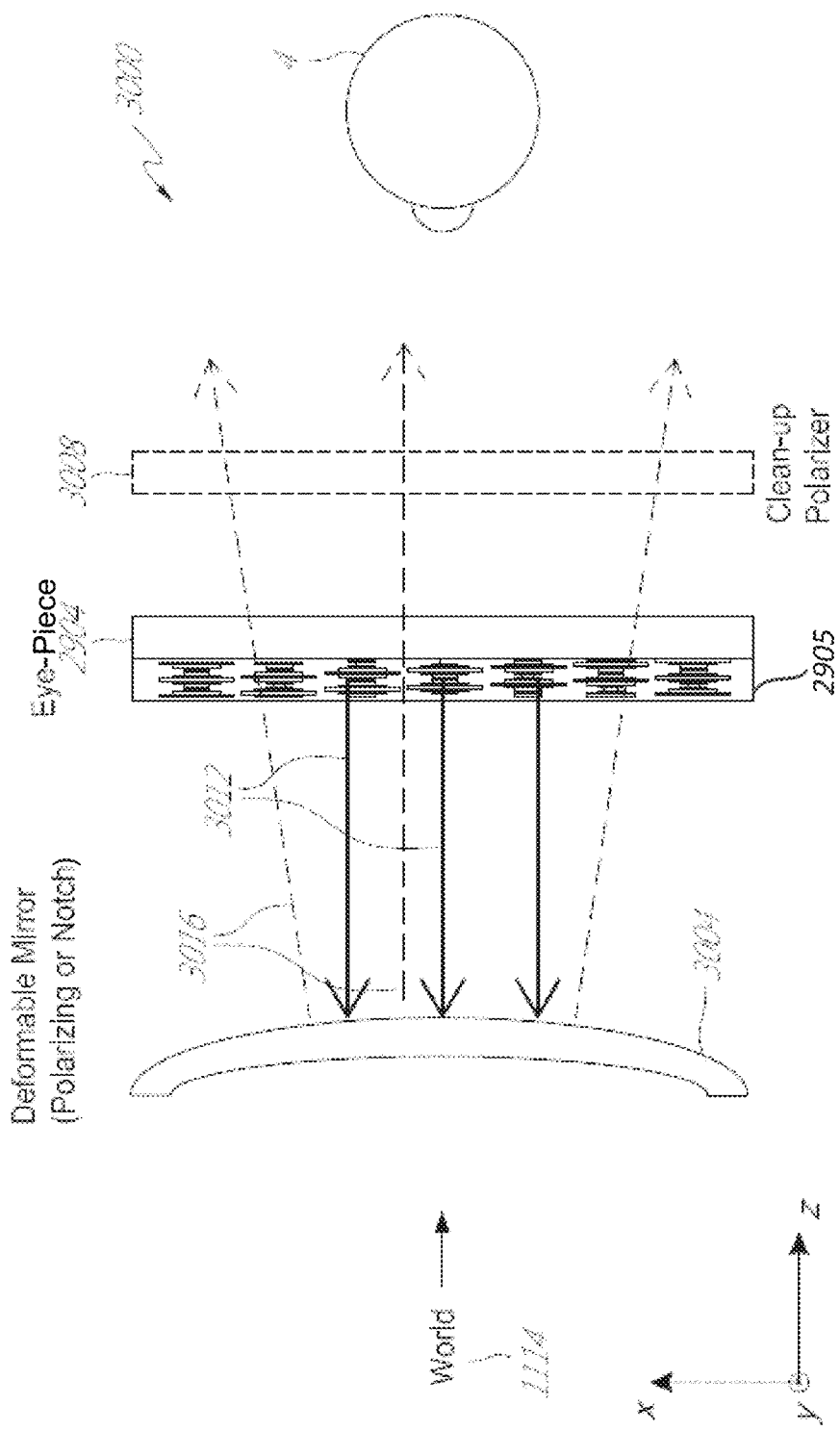
FIG. 10D illustrates an example display device comprising a deformable mirror and a waveguide assembly with a liquid crystal grating.

FIG. 10D illustrates an implementation of a display device 3000 configured to output image information to a user using a waveguide assembly 2904 and a deformable mirror 3004. The display device 3000 comprises a waveguide assembly 2904, where the waveguide assembly 2904 is interposed between a curved or deformable mirror 3004 (so that it has optical power) and an optional clean-polarizer 3008. The waveguide assembly 2904 comprises a cholesteric liquid crystal diffraction grating (CLCG) 2905. The CLCG 2905 can be disposed between the waveguide assembly 2904 and the deformable mirror 3004 in some implementations. The waveguide assembly can comprise one or more waveguides configured to propagate light via total internal reflection. The eyepiece 2904 may be configured to asymmetrically project light, in this example, toward the left (world-ward) rather than to the right (eye-ward). The eyepiece 2904 may comprise DOEs, metamaterials, holograms, etc. that can preferentially project light in the desired, asymmetric direction and/or desired polarization state (e.g., linear or circular). Although, not illustrated, the display device 3000 can comprise an image injection device similar to the image injection device 4000 discussed above with reference to FIGS. 10A-10C.

In operation, some of the light propagating in the x-direction within one or more waveguides within the waveguide assembly 2904 may be redirected, or out-coupled, in the z-direction as a light beam 3012 having a uniform circular polarization (e.g., RHCP). The waveguide assembly 2904 projects the light beam 3012 of a virtual image toward the curved or deformable mirror 3004 (in the opposite to side of the user's eye 4). In some embodiments, the deformable mirror 3004 is coated with a polarizing reflection layer (e.g., multi-layer linear polarization reflectors or broadband cholesteric liquid crystal circular polarization reflectors) to reflect light having a designated polarization, e.g., light having the same polarization as the out-coupling polarization of the CLCGs, and to allow light from the real world 1114 transmitted toward the eye 4. In some other embodiments, instead of a polarizing reflection layer, the deformable mirror 3004 is coated with a notch reflection layer or CLC reflection layer, which is designed to reflect light within a narrow bandwidth Δλ that matches the virtual image bandwidth of the out-coupled light from the waveguide assembly 2904. In some embodiments, a clean-up polarizer 3008 can be placed as shown in FIG. 10D to eliminate any ghost images without going through the deformable mirror.

Although in the various examples shown in FIGS. 10A-10D, a single waveguide 2700 or a waveguide assembly 2904 is shown, a stack of waveguides may be used for outputting image information to user (e.g., as shown in FIG. 6). In certain designs, different waveguide in the stack may correspond to a particular color (e.g., range of wavelengths) and/or depth plane of the display. Similarly, the image injection device 4000, the waveguide 2700, the waveguide assembly 2904 and other elements of the assembly may represent multiple image injection devices, waveguides, etc., respectively. For example, the image injection device 4000 can be a discrete display that produces image information for injection into a corresponding waveguide 2700. In some cases, the image injection device 4000 may comprise an output end of a single multiplexed display which may, e.g., pipe image information via one or more optical conduits (e.g., fiber optic cable) to the image injection device 4000. The image information provided by the image injection device 4000 may include light of different wavelengths, or colors (e.g., different component colors and/or subcolors). Additional information on a stacked waveguide assembly such as one used for waveguide 2700 or waveguide assembly 2904 may be found above in connection with FIG. 6.

As discussed above, the outcoupling elements 5700 discussed above with reference, e.g., to FIGS. 10A and 10B, can be asymmetrical such that the amount of light injected in to the waveguide 2700 from the image injection device 4000 that is directed by the outcoupling elements 5700 towards the forward side of the waveguides and toward the reflector 1032 is greater than the amount of light injected in to the waveguide 2700 from the image injection device 4000 that is directed by the outcoupling elements 5700 towards the rearward side of the waveguide 2700 and the eye 210 of the user. For example, greater than 50% of the light injected into the waveguide 2700 can be directed by the outcoupling elements 5700 towards the reflector 1032. In various embodiments, the amount of injected light that is directed towards the reflector 1032 by the outcoupling elements can be greater than 60%, greater than 70%, greater than 80%, greater than 90%, greater than 95% and/or any other percentage between about 50% and about 99.9%. Embodiments of the outcoupling elements 5700 that can be configured to asymmetrically diffract light such that more light is diffracted in one direction than in another direction can include liquid crystal polarization gratings, volume phase holograms and/or metasurfaces. As discussed above, light injected into the waveguide 2700 that is directed towards the reflector 1032 and to the user's eye 210 can have the benefit of being focus modulated by the reflector 1032 (the wavefront of light can be changed for example such that the light appears to come from an object at another depth). Thus, it can beneficial in some cases if most, e.g., all or substantially all, light injected into the waveguide 2700 is directed towards the reflector 1032.

However, in some embodiments of the display device, most of the light injected into the waveguide 2700 from the image injection device 4000 may not be directed towards the reflector 1032 by the outcoupling elements 5700. In some such embodiments, some of the injected light may be directed towards the user's eye 210. In some such embodiments, a light recycling system such as a polarization based light recycling system comprising an arrangement of retarders (e.g., retarder layers) can be used to recycle the light that is directed towards the user's eye 210 by the outcoupling elements 5700 such that it is directed towards the reflector 1032 to be focus modulated before being incident on the user's eye 210.

Figure 11:
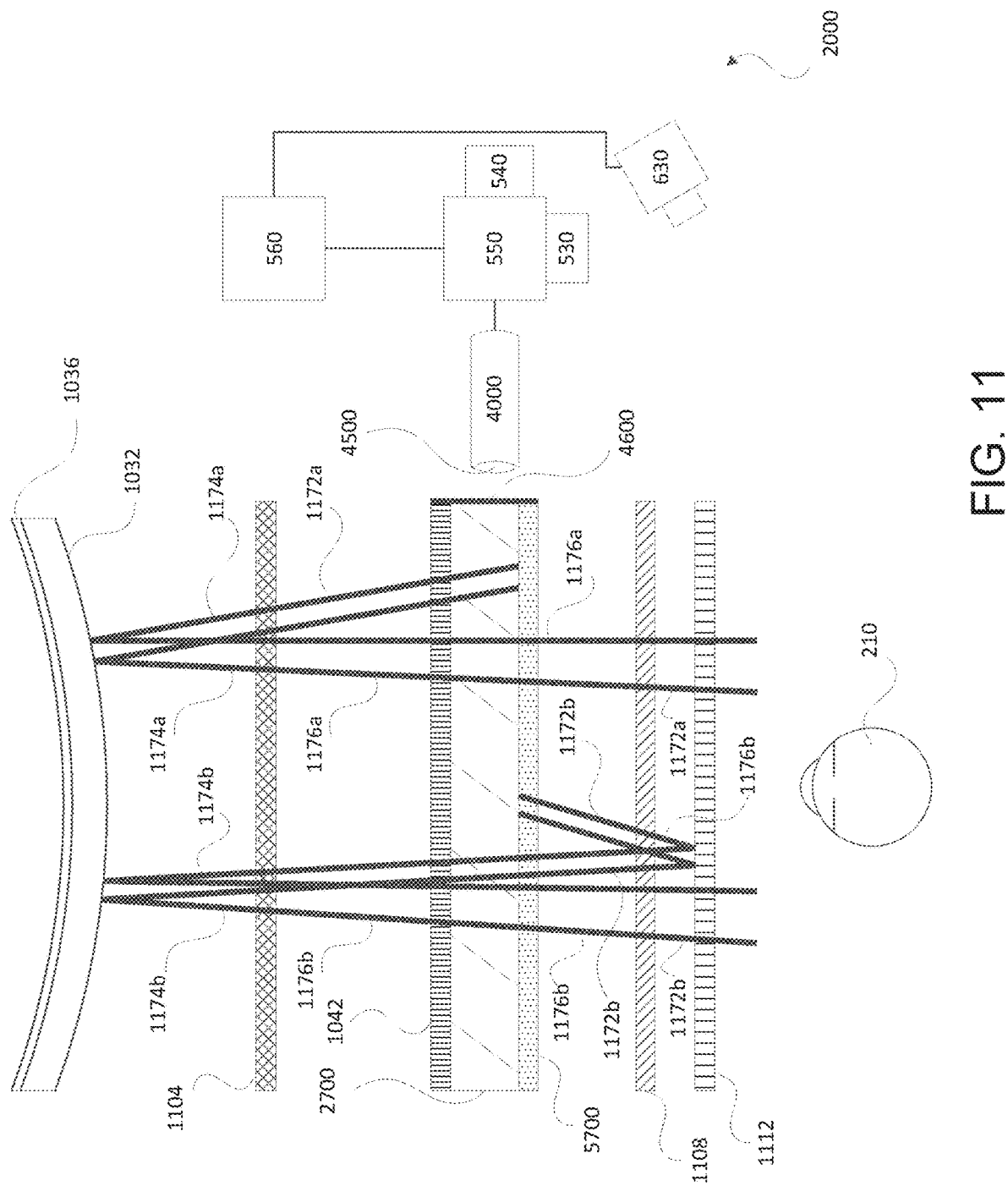
FIG. 11 illustrates a display device including light recycling system comprising an arrangement of retarders that are configured to redirect injected light from the waveguide that is outcoupled towards the user's eye towards the reflector.

FIG. 11 illustrates an embodiment of a display device including a light recycling system, namely a polarization based light recycling system, comprising an arrangement of retarders that are configured to redirect injected light from the waveguide that is outcoupled towards the user's eye 210 towards the reflector 1032. In various embodiments, the arrangement of retarders includes a quarter-wave retarder or quarter-wave plate 1104, which converts linearly polarized light into circular or elliptically polarized light and vice-versa, disposed between the waveguide 2700 and the reflector 1032 and a half-wave retarder or half-wave plate 1108, which is configured to shift (e.g., rotate) the direction of polarization of linearly polarized light, disposed between the waveguide 2700 and the user's eye 210. In various embodiments, the quarter-wave plate 1104 and/or the half-wave plate 1108 can be rigid structures. In some embodiments, the quarter-wave plate 1104 and/or the half-wave plate 1108 can be flexible structures (e.g., films). In some cases, one or more elements or layers having a desired net retardance, such as a net retardance of a quarter of a wavelength ($\lambda/4$) or a net retardance of a half of a wavelength ($\lambda/2$), can be used. The display device illustrated in FIG. 11 further includes a polarization selective reflector 1112 disposed between the half-wave plate 1108 and the user's eye 210. In various embodiments, the polarization selective reflector 1112 can comprise a wavelength selective component (e.g., a notch filter) or reflective liquid crystal device. In various embodiments, the polarization selective reflector 1112 can comprise a metasurface. Embodiments of the polarization selective reflector 1112 comprising a wavelength selective component, a reflective liquid crystal component and/or a metasurface can be configured to reflect light having certain characteristics (e.g., a narrow band of wavelengths and/or specific polarization states) and transmit light not having those certain characteristics.

Consider a portion of light injected into the waveguide 2700 that is outcoupled by the outcoupling optical elements 5700 towards the reflector 1032 as beam 1172a. The beam 1172a is incident on the quarter-wave ($\lambda/4$) plate that converts the polarization state of the beam 1172a from linear to circular/elliptical polarization or vice-versa. Thus, the beam 1174a that is output from the quarter-wave plate 1104 has circular/elliptical polarization if the beam 1172a is linearly polarized (or vice-versa). The beam 1174a is reflected by the reflector 1032 and undergoes focus modulation as discussed above with reference to FIGS. 10A and 10B. The focus modulated reflected beam 1174a passes through the quarter-wave plate 1104 and undergoes a polarization shift from circular/elliptical to linear (or vice-versa). The polarization state of the beam 1176a that is output from the quarter-wave plate 1104 is orthogonal to the polarization state of the beam 1172a. As the beam 1176a traverses the half-wave ($\lambda/2$) plate 1108, the direction of polarization is shifted (or rotated). Thus, the beam 1178a that exits the half-wave plate 1108 has a polarization state that is orthogonal to the polarization state of the beam 1176a. The polarization state of the beam 1178a is identical to the polarization state of beam 1172a. The polarization selective reflector 1112 can be configured to transmit light having the polarization state of beam 1178a (or the polarization state of the beam 1172a) and can reflect light having a polarization state that is orthogonal to the polarization state of beam 1178a (or 1172a).

Consider a portion of light injected into the waveguide 2700 that is outcoupled by the outcoupling optical elements 5700 towards the user's eye 210 as beam 1172b. The beam 1172b is incident on the half-wave plate 1108 that shifts (or rotates) the direction of polarization of the beam 1172b. For example, if beam 1172b is linearly polarized along the vertical direction, then beam 1176b that exits from the half-wave plate is linearly polarized along the horizontal direction. As discussed above, the polarization selective reflector 1112 is configured to transmit light having the polarization state of beam 1172b and reflect light that is orthogonal to the polarization state of beam 1172b. Accordingly, beam 1176b having a polarization state that is orthogonal to the polarization state of 1172b is reflected by the polarization selective reflector 1112 towards the reflector 1032. The direction of the polarization state of the beam 1176b is shifted (e.g., rotated) as it traverses the half-wave plate 1108. Thus, the beam 1178b has the same polarization state as the beam 1172b. The polarization state of the beam 1178b is converted from linear polarization to circular/elliptical polarization as it traverses through the quarter-wave plate 1104. Thus, beam 1174b that exits from the quarter-wave plate 1104 is circularly/elliptically polarized and is reflected by the reflector 1032. The beam reflected from the reflector 1032 is focus modulated and undergoes a shift in polarization from circularly/elliptically polarized to linear polarization as it traverses through the quarter-wave plate 1104. The beam 1180b that exits the quarter-wave plate 1104 has a polarization that is orthogonal to the beam 1178b. For example, if the beam 1178b (or the beam 1172b) is linearly polarized along the vertical direction, then the beam 1180b is linearly polarized along the horizontal direction. The direction of the polarization state of the beam 1180b is shifted (or rotated) as it traverses through the half-wave plate 1108. For example, if the beam 1180b is linearly polarized along the horizontal direction, then the beam 1182b is linearly polarized along the vertical direction. The beam 1182b has the same polarization state as the polarization state of the beam 1172b. The polarization selective reflector 1112 is configured to transmit the focus modulated beam 1182b towards the user's eye 210.

As discussed above, the reflector 1032 can comprise coatings that are configured to reflect light in a narrow band of (visible) wavelengths while transmitting light outside the narrow band of (visible) wavelengths. For example, the reflector 1032 can be configured to reflect light in a narrow range of wavelengths of red, green and/or blue. As another example, the reflector 1032 can be configured to reflect light in a wavelength range of about 5-10 nm around a red center wavelength, for example, 630 nm. As yet another example, the reflector 1032 can be configured to reflect light in a wavelength range of about 5-10 nm around a green center wavelength, such as for example, 550 nm. As another example, the reflector 1032 can be configured to reflect light in a wavelength range of about 5-10 nm around a blue center wavelength such as for example 470 nm. In various embodiments, the reflector 1032 can be configured to reflect light in a wavelength range of about 5-20 nm around a central wavelength in the visible spectral range. In various designs, these narrow wavelength bands may overlap and/or coincide with the wavelengths emitted by the light sources of the display 2000. The display 2000, for example, may include a plurality of color light sources and the narrow band regions of reflectivity of the variable power reflector may coincide or overlap with the color of light emitted by the light sources. For instance, for the example cited above, the light sources in the display 2000 may emit red light that is centered about 630 nm or within 5-10 nm thereof, green light that is centered about 550 nm or within 5-10 nm thereof, and blue light that is centered about 470 nm or within 5-10 nm thereof. Different designs may have light sources and reflector filters having different spectral characteristics, however, in various cases, the wavelength emitted by the light source and the wavelengths reflected by the variable power reflector overlap or coincide while many other visible wavelengths are not reflected and transmit through the variable power reflector. If many other visible wavelengths are transmitted, much of the light from objects forward the wearer and the head mounted display will be visible to the viewer through the head mounted display.

Also as discussed above, the variable power reflector can comprise a polarization selective reflector to selectively reflect light from the display 2000 while transmitting light from objects forward the wearer and the head mounted display. In some designs, for example, the reflector 1032 can be configured to comprise a polarization selective reflector that is configured to reflect light of a specific polarization. For example, the reflector 1032 can be configured to reflect light having particular polarization state while being transmissive to other polarization states, in some cases, many, most, all, or substantially all other polarization states.

Figure 12:
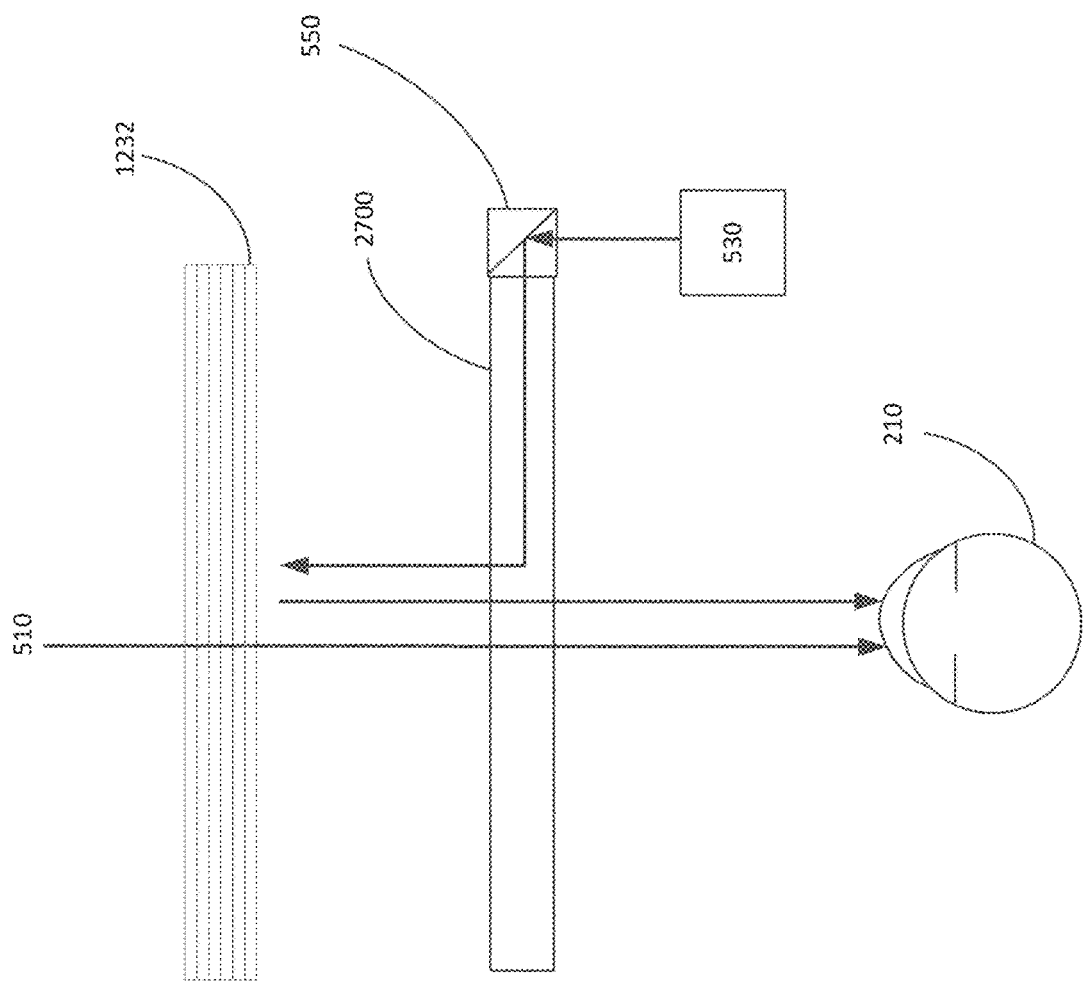
FIG. 12 illustrates a variable power reflector that can comprise one or more switchable optical elements such as a stack or a plurality of switchable reflective elements.

In certain designs, the variable power reflector can comprise one or more switchable optical elements such as a stack or a plurality of switchable reflective elements 1232 as depicted in FIG. 12. Such switchable elements may be configured to switch between two states such as two levels of reflection, for example, a low level of reflection (0% or more) or a higher level of reflection. Similarly, the switchable elements may be configured to switch between two levels of transmission, for example, a low level of transmission (0% or more) or a higher level of transmission. Such switchable optical elements may comprise for example switchable reflectors, switchable diffractive optical elements such as switchable diffractive reflectors or switchable reflective gratings or holographic optical elements. The switchable optical elements may be configured to switch between two power levels such as a low power lever (0 Diopters or higher magnitude) and a higher power level. These power levels may be positive or negative and may switch between two positive powers, two negative power or a positive power and a negative power or a zero power and a non-zero power. Such switchable optical elements may comprise, for example, switchable diffractive optical elements such as switchable diffractive optical lenses.

In various cases, one or more switchable optical elements comprise one or more liquid crystal elements comprising liquid crystal such as a switchable polymer dispersed liquid crystal element. The switchable optical elements may comprise a switchable polarization grating. In certain configurations, the variable power reflector comprises a stack of switchable optical elements wherein different of said switchable optical elements are associated with different optical powers such that said switchable optical element can switch between different optical powers. These optical powers may be provided, for example, by lenses such as diffractive lenses.

In the example illustrated in FIG. 12, different of the plurality of switchable reflective elements have a negative optical power (although one or more the optical powers could be positive or zero in different designs). For example, the plurality or stack of switchable reflective elements can have a first switchable reflective element having a first negative optical power, a second switchable reflective element having a second negative optical power, a third switchable reflective element having a third negative optical power, . . . , a $n^{th}$ switchable reflective element having a $n^{th}$ negative optical power. In certain configurations, one of the first, second, third, . . . , or the $n^{th}$ switchable reflective element can be configured to reflect light outcoupled from the waveguide 2700 while the remaining switchable reflective elements can be configured to be transmissive. In this manner, light outcoupled from the waveguide 2700 that is directed away from the user's eye 210 is reflected from the selected one of the first, second, third, . . . , or the $n^{th}$ switchable reflective element such that it appears to originate from a certain depth plane to the user. In various embodiments, each of the plurality of switchable reflective elements can be configured to reflect specific wavelengths of light such that the specific wavelengths of light appear to originate from a particular depth.

As described above with respect to FIG. 12, some display devices comprise a plurality or a stack of switchable reflective elements. Advantageously, each of the switchable reflective elements can comprise liquid crystals, as described elsewhere in the specification and in the following with respect to, e.g. FIGS. 13A-13C. For example, the switchable reflective elements may be formed of unpolymerized or polymerizable liquid crystals, or reactive mesogens (RM), whose configurations can be altered by an external stimulus, e.g., electric field.

In some embodiments, switchable reflective elements can comprise a liquid crystal, such as, for example, a cholesteric liquid crystal (CLC) layer as discussed above. FIGS. 13A and 13B illustrate an example switchable reflective element 3100A that can be implemented as part of a display device, where switchable reflective element 3100A is formed of a patterned CLC layer serving as a reflective polarizing mirror. FIG. 13A illustrates local orientations of liquid crystal directors (arrows) on top of a binary Fresnel lens pattern. Accordingly, the switchable reflective element 3100A can be configured to have optical power that is adjustable using an applied electric field. Embodiments of the switchable reflective elements 3100A can be used as an alternative to a deformable mirror illustrated with respect to, e.g., FIGS. 10A-10C and 11.

Referring to FIG. 13B, when the switchable reflective element 3100A is illuminated with circularly polarized incident light 3012 having a circular polarization that corresponds to (e.g., having the same handedness as) the handedness of the CLC chirality (e.g., RHCP), the reflected light 3016 exhibits a lens effect similar to curved mirror reflectors described above. On the other hand, light with the orthogonal polarization (e.g., LHCP) is transmitted without interference. The switchable reflective element 3100A can be configured to have a bandwidth in a range of less than about 10 nm, less than about 25 nm, less than about 50 nm, less than about 100 nm, or some other range.

Figure 13C:
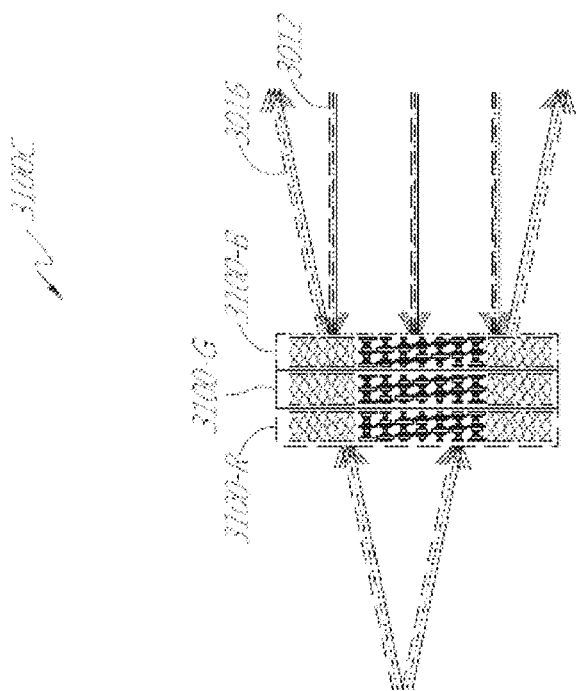
FIGS. 13A-13C illustrate example reflective diffraction lenses that can be implemented as part of a display device, where the reflective diffraction lenses are formed of patterned CLC materials serving as a reflective polarizing mirror.
Figure 13B:
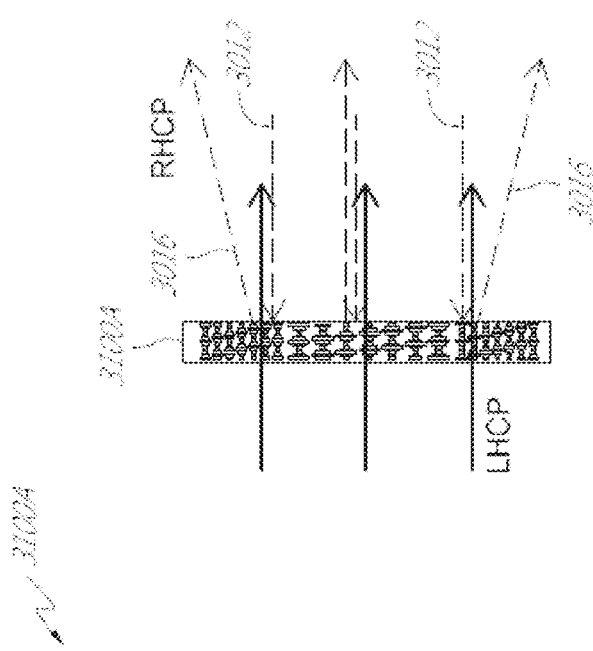
Figure 13A:
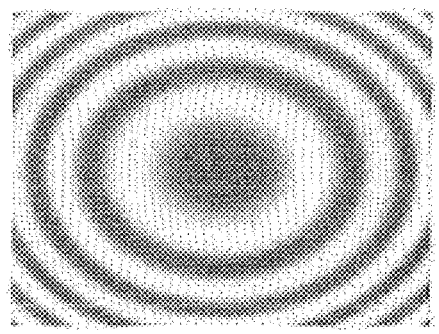

FIG. 13C illustrates a switchable reflective element 3100C comprising a plurality of switchable reflective elements 3100-R, 3100-G and 3100-B. In the illustrated embodiment, the switchable reflective elements 3100-R, 3100-G and 3100-B are in a stacked configuration and are configured to reflect light within a range of wavelengths Δλ within the red, green and blue spectra, respectively. When the switchable reflective element 3100C is illuminated with circularly polarized incident light 3012 having a circular polarization that corresponds to the handedness of the CLC chirality (e.g., RHCP) and a wavelength within a range of wavelengths Δλ within the red, green and blue spectra, the reflected light 3016 exhibits a lens effects similar to curved mirror lenses. On the other hand, light with the orthogonal polarization (e.g., LHCP) is transmitted without interference.

FIG. 14 illustrates an embodiment of a stack or plurality of switchable reflective elements 1232 having a plurality of switchable reflective elements 1404a, 1404b, 1404c, 1408a, 1408b and 1408c. The reflective elements 1404a-1404c are configured to have a first negative optical power and the reflective elements 1408a-1408c are configured to have a second negative optical power. The reflective elements 1404a and 1408a can be configured to reflect a first range of wavelengths (e.g., about 5-10 nm around red). The reflective elements 1404b and 1408b can be configured to reflect a second range of wavelengths (e.g., about 5-10 nm around green). The reflective elements 1404c and 1408c can be configured to reflect a third range of wavelengths (e.g., about 5-10 nm around blue). Each of the reflective elements 1404a, 1404b, 1404c, 1408a, 1408b and 1408c is sandwiched between a pair of electrodes 1173. A selected one of the reflective elements 1404a, 1404b, 1404c, 1408a, 1408b and 1408c can be switched on or off by applying an electrical voltage across the pair of electrodes 1173 bounding the selected one of the reflective elements 1404a, 1404b, 1404c, 1408a, 1408b and 1408c.

In various embodiments, each of the plurality of switchable reflective elements in the stack 1232 can comprise, for example, liquid crystal diffraction gratings, polymer dispersed liquid crystal grating structures and/or polarization grating structures. In various embodiments, each of the plurality of switchable reflective elements can be switched on or off in a frame sequential manner of on a pixel-by-pixel basis. The switchable reflective elements may comprise diffractive optical elements such as diffractive lenses.

Additionally, in various embodiments, the stack of reflective elements 1232 can be integrated with a deformable membrane (e.g., the variable power reflector 1032) to provide additional control to adjust the divergent optical power of the reflective stack.

Referring to FIG. 12, image content from an image projection device 1282 (e.g., a spatial light modulator) is injected into the waveguide 2700 via an optical coupling element 2050. In various embodiments, the optical coupling element 2050 can comprise a polarization beam splitter. Light from the waveguide 2700 is directed towards the reflector 1232 by outcoupling elements associated with the waveguide 2700 (e.g., outcoupling elements 5700). In various embodiments, an light recycling system such as a polarization based light recycling system comprising arrangement of retarders as discussed above with FIG. 11 can be used in the example of the display device illustrated in FIG. 12 to redirect any light from the waveguide 2700 that is directed towards the user's eye 210 towards the reflector 1232. Light outcoupled from the waveguide 2700 and directed to the variable power reflector can be reflected from the variable power reflector by switching one of the reflective elements so that the user's eye 210 receives light from the display at a particular divergence (possibly including no divergence but rather collimation) and thus perceives the light as originating from a object at a particular depth in front of the wearer such as near the wearer or far away. It is noted that light from the ambient environment (also referred to herein as the world) 510 surrounding the display device is transmitted through the reflector 1232 towards the user's eye 210.

Although not illustrated, the waveguide 2700 in FIGS. 11 and 12 can include a stack of waveguides as described above with reference to FIG. 6. The combination of the stack of waveguides and the variable reflector 1032 or the stack of switchable reflective elements 1232 can possibly be useful to provide increased ability to provide the desired depth.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display device, comprising:
   a waveguide configured to propagate visible light under total internal reflection in a direction parallel to a major surface of the waveguide and to outcouple the visible light in a direction normal to the major surface; and
   a deformable mirror configured to reflect visible light having a first polarization, wherein the deformable mirror comprises at least one of one or more notch reflectors or one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, and wherein arrangements of the liquid crystal molecules of the chiral structures vary periodically in a lateral direction perpendicular to the layer depth direction such that the one or more CLC layers are configured to Bragg-reflect incident light,
   wherein the waveguide is configured to outcouple the visible light towards the deformable mirror.

2. The display device of claim 1, wherein the deformable mirror comprises the one or more CLC layers, and wherein different ones of the one or more CLC layers are configured to reflect visible light having a wavelength in a wavelength range corresponding to different ones of red, green or blue light, while being configured to transmit light having a wavelength outside the wavelength range.

3. The display device of claim 1, wherein the deformable mirror comprises the one or more CLC layers, and wherein each of the chiral structures of the CLC layers comprises a plurality of liquid crystal molecules that extend in a layer depth direction by at least a helical pitch, and wherein different ones of the one or more CLC layers have different helical pitches.

4. The display device of claim 1, wherein the deformable mirror comprises the one or more CLC layers, and wherein different ones of the one or more CLC layers have substantially the same optical power.

5. The display device of claim 1, wherein the deformable mirror comprises the one or more notch reflectors, wherein each of the notch reflectors is configured to reflect visible light having the first polarization, wherein each of the notch reflectors comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, and wherein arrangements of the liquid crystal molecules of the chiral structures vary periodically in a lateral direction perpendicular to the layer depth direction such that the one or more CLC layers are configured to Bragg-reflect incident light.

6. The display device of claim 5, wherein different ones of the one or more notch reflectors have different optical powers.

7. The display device of claim 5, further comprising a half-wave plate corresponding to each of the one or more notch reflectors.

8. The display device of claim 1, wherein the waveguide comprises a cholesteric liquid crystal diffraction grating configured to outcouple some of the visible light propagating in the waveguide towards the deformable mirror.

9. The display device of claim 1, wherein the deformable mirror is configured to redirect the visible light directed by the waveguide toward the deformable mirror back toward the waveguide.

10. The display device of claim 9, wherein the deformable mirror comprises a forward side and a rearward side, the rearward side positioned closer to the waveguide than the forward side, and wherein the deformable mirror is configured to allow at least some light transmitted from an external light source positioned on the forward side of the deformable mirror to pass through the deformable mirror.

11. The display device of claim 1, further comprising a frame configured to dispose the waveguide forward of an eye of a wearer such that the waveguide comprises a forward side and a rearward side, the rearward side positioned closer to the eye than the forward side, wherein the deformable mirror is disposed on the forward side and is configured to redirect light from the waveguide toward the eye of the wearer.

12. The display device of claim 11, further comprising a light projector configured to output the visible light toward the waveguide, wherein the deformable mirror is configured to reflect the visible light having the first polarization while transmitting light from an external light source located forward of the deformable mirror.

13. The display device of claim 12, further comprising one or more in-coupling elements disposed with respect to the waveguide to redirect the visible light from the light projector into the waveguide.

14. The display device of claim 11, further comprising one or more out-coupling elements disposed with respect to the waveguide to selectively extract some of the visible light propagating in the waveguide and direct the extracted visible light toward the deformable mirror, the light being redirected from the deformable mirror back through the waveguide and into the eye of the wearer.

15. The display device of claim 14, wherein the one or more out-coupling elements comprise a cholesteric liquid crystal diffraction grating.

16. A display device, comprising:
a waveguide configured to propagate visible light under total internal reflection in a direction parallel to a major surface of the waveguide and to outcouple the visible light in a direction normal to the major surface; and
a deformable mirror configured to reflect visible light having a first polarization, wherein the deformable mirror comprises at least one of one or more notch reflectors or one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, and wherein arrangements of the liquid crystal molecules of the chiral structures vary periodically in a lateral direction perpendicular to the layer depth direction such that the one or more CLC layers are configured to Bragg-reflect incident light,
wherein the waveguide comprises a cholesteric liquid crystal diffraction grating configured to outcouple some of the visible light propagating in the waveguide towards the deformable mirror.

17. The display device of claim 16, wherein the deformable mirror comprises the one or more CLC layers, and wherein at least one of:
different ones of the one or more CLC layers are configured to reflect visible light having a wavelength in a wavelength range corresponding to different ones of red, green or blue light, while being configured to transmit light having a wavelength outside the wavelength range;
each of the chiral structures of the CLC layers comprises a plurality of liquid crystal molecules that extend in a layer depth direction by at least a helical pitch, and wherein different ones of the one or more CLC layers have different helical pitches; or
different ones of the one or more CLC layers have substantially the same optical power.

18. The display device of claim 16, wherein the deformable mirror comprises the one or more notch reflectors, wherein each of the notch reflectors is configured to reflect visible light having the first polarization, wherein each of the notch reflectors comprises one or more cholesteric liquid crystal (CLC) layers, wherein each of the CLC layers comprises a plurality of chiral structures, wherein each of the chiral structures comprises a plurality of liquid crystal molecules that extend in a layer depth direction and are successively rotated in a first rotation direction, and wherein arrangements of the liquid crystal molecules of the chiral structures vary periodically in a lateral direction perpendicular to the layer depth direction such that the one or more CLC layers are configured to Bragg-reflect incident light.

19. The display device of claim 18, wherein different ones of the one or more notch reflectors have different optical powers.

20. The display device of claim 16, wherein the deformable mirror is configured to redirect the visible light directed by the waveguide toward the deformable mirror back toward the waveguide.

* * * * *